United States Patent
Kreiner et al.

(10) Patent No.: US 6,295,526 B1
(45) Date of Patent: *Sep. 25, 2001

(54) METHOD AND SYSTEM FOR PROCESSING A MEMORY MAP TO PROVIDE LISTING INFORMATION REPRESENTING DATA WITHIN A DATABASE

(75) Inventors: Barrett Morris Kreiner, Norcross; Edward Paul Litwin, Lilburn, both of GA (US)

(73) Assignee: BellSouth Intellectual Property Corporation, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,881

(22) Filed: Oct. 14, 1997

(51) Int. Cl.[7] .................................................. G06F 17/30
(52) U.S. Cl. .................................... 707/2; 707/1; 707/100
(58) Field of Search ................................ 707/1, 3, 4, 5, 707/10, 102, 104, 513, 2, 100

(56) References Cited

U.S. PATENT DOCUMENTS

| | | | | |
|---|---|---|---|---|
| 5,379,391 | * | 1/1995 | Belsan et al. | 711/114 |
| 5,636,350 | * | 6/1997 | Eick et al. | 345/440 |
| 5,649,139 |   | 7/1997 | Weinreb et al. | 711/202 |
| 5,708,825 | * | 1/1998 | Sotomayor | 395/762 |
| 5,727,156 | * | 3/1998 | Herr-Hoyman et al. | 395/200.49 |
| 5,778,367 | * | 7/1998 | Wesinger, Jr. et al. | 707/10 |
| 5,794,233 | * | 8/1998 | Rubinstein | 707/4 |
| 5,802,518 | * | 9/1998 | Karaev et al. | 707/9 |
| 5,813,006 | * | 9/1998 | Polnerow et al. | 707/10 |
| 5,864,871 | * | 1/1999 | Kitain et al. | 707/104 |
| 6,055,538 | * | 4/2000 | Kessenich et al. | 707/101 |

OTHER PUBLICATIONS

"solaris mmap.2". Can be found at the following uniform resources location (URL) address on the Internet: http://www.uwaterloo.ca/man/solaris/mmap.2.html.

* cited by examiner

Primary Examiner—Jean R. Homere
Assistant Examiner—Greta L. Robinson
(74) Attorney, Agent, or Firm—John S. Pratt, Esq.; Kilpatrick Stockton LLP

(57) ABSTRACT

Target elements of a search query are selected by referring to elements or listings within a data structure called a memory map module. Each target element is pre-validated against data available within a database (related to the memory map module). The memory map module has an index to the data as well as relationship information between the data. The memory map module is searched to find listings related to the target elements of the search query. In one embodiment, the memory map module is searched by determining a range reference using a first table of the relationship information. A range is determined using the range reference to a second table of the relationship information. The range is used to search the index to find the listings. In another embodiment, a string space of the relationship information is searched for each instance of the target element. An offset for the instance is determined and is mapped back to a matching listing in the index. A matching listing for each instance of the target elements is respectively added to the listings for each of the target elements. An intersection between the listings for each target element is determined. The listings within the intersection are arranged according to a display order. The display order can be a predetermined or randomized order. The listings within the intersection are displayed as listing information related to the search query. Additional information about a listing can be determined by narrowly and quickly searching the database.

23 Claims, 13 Drawing Sheets

FIG.2E

Netscape: BELLSOUTH Interactive Yellow Pages — 202

Netsite: http://yellowpages.bellsouth.com/

Welcome to
BELLSOUTH

Yellow Pages for
Atlanta, Georgia — 204

ADDITIONAL INFORMATION

MARRIOTT HOTEL MARQUIS   ALSO KNOWN AS:
265 PEACHTREE CENTER NE  CHAMPIONS
ATLANTA, GEORGIA          LAFUENTE
(404) 521-0000            MARRIOTT HOTEL MARQUIS
ZIP CODE: 30303

BUSINESS HOURS:
SUNDAY:     OPEN 24 HOURS
MONDAY:     OPEN 24 HOURS
TUESDAY:    OPEN 24 HOURS
WEDNESDAY:  OPEN 24 HOURS
THURSDAY:   OPEN 24 HOURS
FRIDAY:     OPEN 24 HOURS
SATURDAY:   OPEN 24 HOURS

PAYMENT TYPES:
AMERICAN EXPRESS
CHECK

INTERACTIVE DIRECTORIES

URL'S/E-MAIL:
http://www.marriott.com
http://askmarriott.com

SPECIAL INFORMATION

Weekend rates as low as $99 based on availability.
Convenient to downtown & Midtown shops and dining.
On MARTA. Connect now to find out more!

Full amenities such as a Health Spa and Indoor Pool
In room massages available.

Meeting and banquet facilities available for any size
party from two to two thousand. Let us plan your
next Corporate outing.

Home
Help
Disclaimer

METHOD AND SYSTEM FOR PROCESSING A MEMORY MAP TO PROVIDE LISTING INFORMATION REPRESENTING DATA WITHIN A DATABASE

RELATED APPLICATION

This U.S. patent application relates to pending U.S. patent application Ser. No. 08/844,751, entitled "A System and Methods for Dynamically Processing an Index to Dynamically Create a Set of Questions" and filed on Apr. 22, 1997, now U.S. Pat. No. 5,878,423 and U.S. patent application Ser. No. 08/866,228, entitled "A System and Methods for Routing Information Within an Adaptive Routing Architecture of an Information Retrieval System" and filed on May 30, 1997 now U.S. Pat. No. 5,937,168. The present application and the related pending U.S. patent applications are commonly assigned to BellSouth Corporation.

TECHNICAL FIELD

This invention generally relates to information retrieval and, more particularly described, relates to processing a memory map related to a database in order to provide listing information about data within the database.

BACKGROUND OF THE INVENTION

One might say that an explosion has rocked the world of information in the form of an ever-increasing amount of recorded and searchable information. To efficiently search for specific information within this ever-increasing amount of information, information retrieval systems have been developed.

Information retrieval systems ("IR systems") are systems for finding, organizing, and delivering information. A computerized IR system typically responds to data inquiries by routing messages and files between a user interface and a search engine for a database in order to perform a search of the database for desired information.

The time it takes for the IR system to service a data inquiry is usually referred to as the IR system's response time. However, as the IR system becomes more heavily used and as the IR system searches larger and larger databases, response time within the IR system may begin to diminish. Some searches within the IR system may take an undesirably long amount of time to retrieve the desired information. Long response times are very undesirable for the IR system because use of the IR system may seem to be cumbersome and slow. Users of such slow IR systems may then become frustrated and disenchanted with the particular IR system.

For example, in today's world of vast amounts of online digital information, a single database may easily be over 2 Gigabytes. Such large databases may exceed the capacity of a typical hard disk drive used in a conventional computer. Other depositories of information are maintained in huge databases using multiple high capacity memory storage units, such as CD-ROMs or DVD drives. Sifting and searching through such databases may involved loading and unloading multiple disks in order to find the desired information. The time it takes to load and unload multiple disks shows up as an undesirably increased response time.

One way in which to reduce the response time is to maintain the entire database within quickly accessible memory, such as random access memory (RAM). This solution may help to reduce response times because RAM access times are typically faster than most memory storage unit access times. For example, RAM has typical access times of 70 nanoseconds while fast hard disk drives may have typical access times of just less than 10 milliseconds. Thus, copying the entire database into a more quickly accessible form of computer-readable memory can reduce the time an IR system takes to respond to a data inquiry with the desired information.

However, the use of quickly accessible memory to store an entire database can be problematic because the use may not be economically nor physically feasible to accomplish. If the database is very large, the cost associated with outfitting a computer with the appropriate amount of RAM can become astronomical. The cost associated with the RAM may easily eclipse the cost of the rest of the computer.

Additionally, the design of many conventional computers typically includes a limitation on the amount of RAM recognized by the computer system. The ability to recognize only a limited amount of RAM is usually because of the limited addressable memory space within the computer. The addressable memory space is limited because of the width of the address bus within the hardware architecture of the computer. If a database is larger than the amount of addressable RAM, only a portion of the database can be loaded at a time. If only a portion of the database can be loaded at a time, the database is usually searched by swapping in and out other portions of the database to RAM. An IR system using such a computer system that must perform time-consuming swapping operations may be plagued by slow response time problems when responding to a data inquiry.

Even if the computer can support enough memory, the creation of a copy of the database within quickly accessible memory, such as RAM, still may not resolve the response time issue to a user's satisfaction. The use of a copy of the database within quickly accessible memory still requires time spent performing many broad, although quick, searches through a database to find the right information. Accessing the database while the database is resident in RAM is analogous to performing a faster search for the proverbial needle within a haystack. While the searches may proceed quicker, the search for the needle (the desired data) may still take time. This is because the size of the haystack (the size of the database) may still be overwhelming and because the needle (the desired data) could be anywhere within the haystack (the database). Thus, the response time for a search may still rise to an undesirable level for very large databases.

In summary, there is a need for a general solution for quickly performing a search for information represented within a database that (1) maintains a desirable level of response time for users of the IR system, (2) saves memory space within quickly accessible memory, (3) uses a memory map to provide the information without having to incur the response time of actually searching the database in order to provide the information, and (4) focuses any search of the database to a narrow region in order to enhance the response time involved with the search.

SUMMARY OF THE PRESENT INVENTION

The present invention generally provides methods for processing a memory map (also called a memory map module) to provide listing information representing data within a database. The memory map module has an index to the data within the database and has relationship information between the data within the database.

Stated generally, the method begins creating a search query by referring to the memory map. Typically, the search query is created by using one or more target elements from the index. Additionally, the target element is typically pre-validated against the data within the database using the memory map. By pre-validating the target element, the target element is known to be useful in providing listing information based upon the search query.

The index and relationship information within the memory map are searched for the listing information related to the search query. The listing information is delivered as results of searching the memory map.

In one aspect of the present invention, searching the memory map for the listing information may comprise searching the relationship information for a range within the index and then searching the index for the listing information using the range. More particularly stated, the memory map may be searched for the listing information by determining a range reference using a first table of the relationship information and the target element. The range may be determined using a second table of the relationship information and the range reference. The index may then be searched for the listing information using the range.

In another aspect of the present invention, searching the memory map for the listing information may comprise searching the relationship information for each instance of the target element. Each instance of the target element may respectively be mapped to a matching listing within the index. The matching listings for a target element typically determines the listing information for the target element. More particularly stated, a string space may be searched for each instance of the target element. An offset is typically respectively determined for each instance of the target element found within the string space. Each offset is then respectively mapped to a matching listing within the index. The matching listings for each target element are added to a listing set providing the listing information.

Additionally, a display order of the listings may be determined. The display order may be a predetermined order and may be a randomized order. Furthermore, the listing information for the listings may be displayed according to the display order. If additional information is desired concerning one the of the listings, the data within the database may be searched. In this way, the database is only searched in a narrow and focused manner before the additional information is displayed.

More particularly described, an embodiment of the present invention provides a computer-readable medium on which is stored a computer program for processing a memory map to provide listing information representing data within a database. Pursuant to this embodiment, the computer program has instructions, which when executed by a computer, selects target elements as a search query. The target elements are selected by referring to a memory map. The memory map has an index to data within the database and has relationship information between the data within the database. The target elements are typically selected by identifying the target elements from within the index and pre-validating the target elements against the data within the database using the index.

The index and relationship information are searched for listing sets respectively related to each of the target elements. In one aspect of the present invention, the index and relationship information are searched for listing sets by determining a range within the relationship information using one of the target elements. Typically, the relationship information comprises two tables. The first table may be searched for a range reference to the second table. Then, the second table may be searched for the range using the range reference. The index is then searched for one of the listing sets using the range. Using the remaining target elements of the search query, the index and the relationship information is searched for the remaining listing sets corresponding to the remaining target elements. The listing information may be retrieved based upon the listing sets.

An intersection of the listings is determined among the listing sets. The listings of the intersection are then arranged according to a display order, typically a predetermined order or a randomized order. The listings of the intersection are then displayed in the display order as the listing information.

Furthermore, if additional information about one of the listings within the intersection is desired, a search may be performed. The search involves searching the data within the database to provide the additional information about the desired listing.

In yet another aspect of the present invention, a data structure provides listing information representing data within a database. The data structure comprises a first portion and a related second portion. The first portion provides an index to the data within the database. The index has a plurality of listings related to the data within the database. The second portion provides relationship information between the data within the database and the listings within the index from the first portion. The relationship information may comprise a first table and a second table, each of which are used to provide an address range within the index. The relationship information may also comprise a name string space populated with character strings. The character strings correspond to the listings within the index. The relationship information may also comprise an address string space related to the listings within the index. The address string space is related to a location of the data within the database corresponding to specific listings in the index. Thus, the relationship information in the first portion and the listings within the index of the second portion interrelate together to provide the listing information.

Although the exemplary embodiments of the present invention are directed towards systems and methods for processing a memory map to provide listing information representing data within a database, it should be understood that the present invention may be applied to a broad variety of other information retrieval systems and databases.

In summary, it is an object of the present invention to provide a system and method for processing a memory map to provide listing information representing data within a database.

It is a further object of the present invention to provide a system and method that maintains a desirable level of response time for users of an IR system.

It is still a further object of the present invention to save memory space within quickly accessible memory when representing a database's information.

It is still a further object of the present invention to use a memory map to provide the listing information without having to incur the response time of searching the database in order to provide the listing information.

It is still a further object of the present invention to focus any search of a database to be narrow and specific in order to enhance the response time involved with the search.

The present invention and its object and advantages, those described above and otherwise, will be appreciated from studying the following detailed description, drawings, and the appended claims.

BRIEF DESCRIPTION OF THE DRAWINGS

FIGS. 2A, 2B, 2C, 2D and 2E are screen displays illustrating various user interface (UI) screen shots which are generated and displayed to a user of an exemplary IR system in accordance with an embodiment of the present invention.

DETAILED DESCRIPTION OF THE EXEMPLARY EMBODIMENT

Definitions

Figure 1:
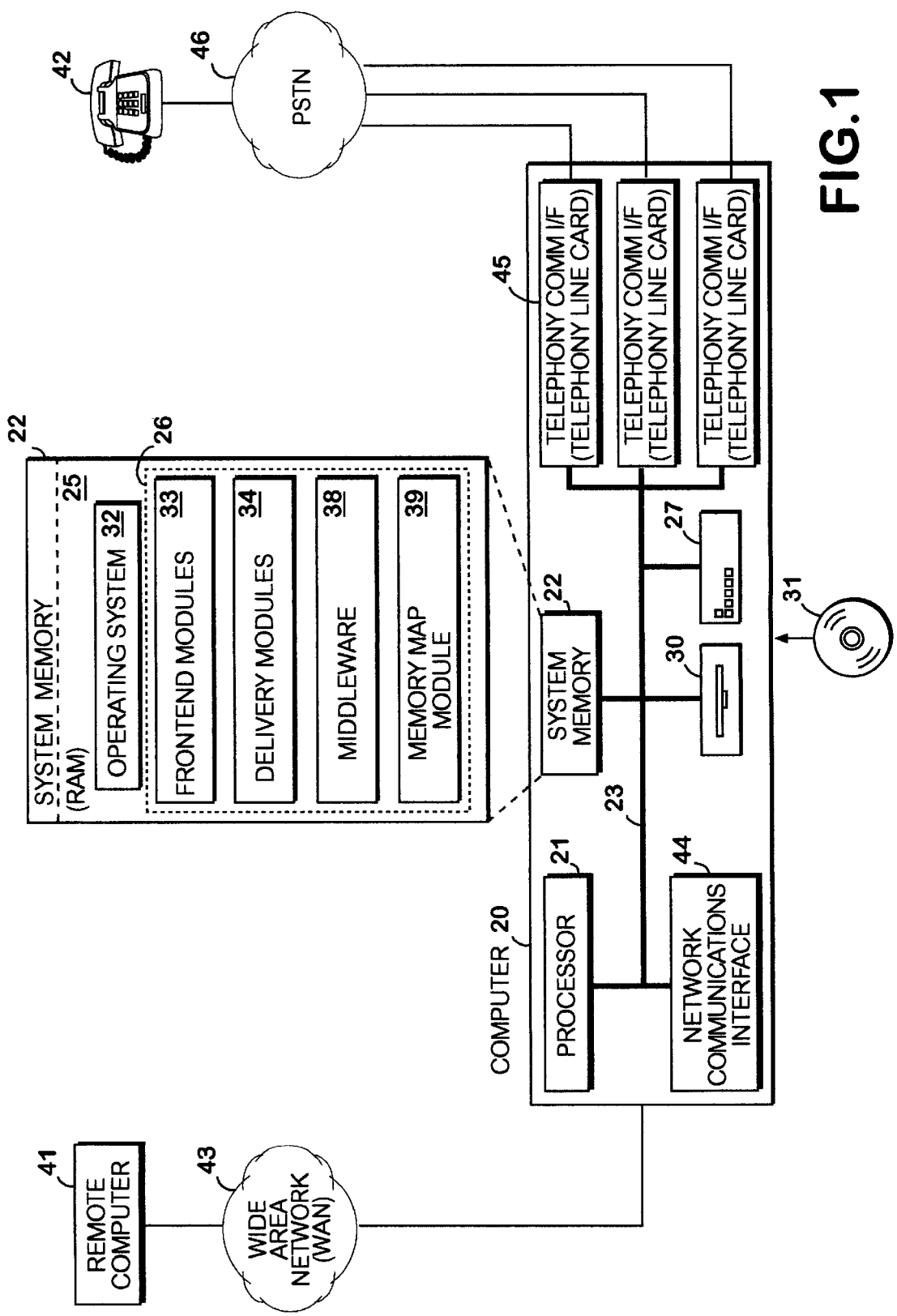
FIG. 1 is a block diagram of a computer system that provides an exemplary operating environment for an embodiment of the present invention.

Throughout the detailed description of embodiments of the present invention, terms familiar to one skilled in the art will be used. Additionally, the following definitions should be used in reference to embodiments of the present invention described herein:

"DISPLAY ORDER"—an order or sequence of listings.
"INDEX"—a structured guide or tool, associated with a database, used to find information within the database.
"LISTING"—an element within an index.
"LISTING INFORMATION"—information about an element or listing within an index that summarizes other data within a database.
"LISTING SET" or "SET OF LISTINGS"—a group or plurality of listings found within the index that relate to a single target element of a search query.
"MEMORY MAP"—a data structure allocated in memory comprising an index and relationship information.
"RANGE"—a pointer to a section of the index.
"RANGE REFERENCE"—a pointer to a range.
"RELATIONSHIP INFORMATION"—information defining data-to-data relationships of data within a database.
"SEARCH ENGINE"—a software module capable of searching a database for specific data within the database's records.
"SEARCH QUERY"—a group or plurality of target elements defining search parameters used when attempting to find listing information.
"STRING SPACE"—a file having character strings.
"TARGET ELEMENT"—an independently searchable part of a search query.

Introduction

The present invention is directed to a system and methods for processing a memory map to provide listing information representing data within a database. The memory map is essentially a data structure within memory associated and coupled to a database. The memory map is typically smaller in size than the database. The memory map comprises an index related to the database's data and relationship information about the data-to-data relationships within the database's data.

The index is essentially a guide used to find information from within the database, such as a database of classified advertising information. An exemplary index has listing information related to data within the database. A listing is related to a specific record of data within the database. For a single listing within the index, the listing information may include a reference number for the listing (also called an account number), a display number for determining the order of displaying the listing information, geographic information about the listing, street address information related to the listing, name information on the listing, as well as other keywords or terms describing the listing and categorizing the listing.

As previously mentioned, the relationship information defines data-to-data relationships of data within the database. This relationship information is useful when searching for listing information related to the data. In one embodiment of the present invention, the relationship information includes two file structures, preferably tables, which are used in what is called a pointer/list method of searching the memory map for listing information. In another embodiment of the present invention, the relationship information includes two other file structures, preferably string spaces, which are used in what is called a reverse mapping, method of searching the memory map for listing information.

The exemplary embodiment of the present invention is represented by a group of software modules operating, as an interactive information retrieval system (hereinafter the IR system) that uses or processes the memory map. Briefly described, the IR system allows a user to select target elements of a search query using, information contained within the memory map. By using the information within the memory map, the target elements of the search query may be "pre-validated" assuring that there is valid data in the database related to the target element.

Once the target elements of the search query are selected, the memory map is further used (e.g., processed and searched) to find listing information related to data within the database. By processing and searching the memory map instead of the larger database, significant response time savings can be made. The listing information is displayed back to the user in a predetermined display order. If the user needs more information about a listing than is provided within the listing information, a narrow and focused search may be performed on the larger database. By performing only narrow and focused searches of the database, the response time when searching the database for listing information is advantageously minimized. The creation and use of such a memory map is the general focus of the present invention.

Although the preferred embodiment is generally described in the context of the software modules in the IR system used with a computer system, those skilled in the art will recognize that the present invention also can be implemented in conjunction with objects and other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. Other methods and system implementations will occur to those skilled in the art.

The detailed description which follows is represented largely in terms of processes and symbolic representations of operations by conventional computer components, including a processor, memory storage devices, data communication networks, and communications interfaces such as telephony line cards or network interface cards. Furthermore, these processes and operations may utilize conventional computer components in a heterogeneous distributed computing environment, including remote file servers, compute servers, and remote memory storage devices.

The processes and operations performed by the computer, in both a stand-alone environment and a distributed computing environment, include the manipulation of signals by a processor and the maintenance of these signals within data sets, such as the database, and data structures, such as the memory map. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements. Each of these data sets and data structures are resident in one or more memory storage devices. In the context of the present invention, a data structure can be created from the separate elements or objects of a data set or another data structure. A memory map is an example of such a data structure. In the context of the present invention, a database can be a data set or a data structure depending on the particular implementation. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, terms, listings, data, objects, strings, files or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as providing, arranging, searching, transmitting, receiving, mapping, determining, identifying, storing, selecting, adding, etc. which are often associated with manual operations performed by a human operator. The operations described herein are machine operations performed in conjunction with various input provided by a human operator or user that interacts with the computer or a device connected to the computer.

In addition, it should be understood that the programs, processes, methods, etc. described herein are not related or limited to any particular computer (standalone or distributed) or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment are described.

The Operating Environment for Embodiments of the Invention

FIG. 1 and the following discussion are intended to provide a brief, general description of an exemplary computing environment in which the present invention may be implemented and operated. Embodiments of the invention are described in the general context of software program modules that run on an operating system in conjunction with a computer. Generally, program modules include routines, programs, components, data structures, etc., that perform particular tasks or implement particular abstract data types. Moreover, those skilled in the art will appreciate that the invention may be practiced with other computer system configurations, including multiprocessor systems, other microprocessor-based or programmable electronic devices, minicomputers, mainframe computers, and the like. Those skilled in the art will appreciate that FIG. 1 and the associated discussion are intended to provide a brief, general description of exemplary computer hardware and program modules, and that additional information is readily available in the appropriate programming manuals, users guides, and similar publications.

Referring now to FIG. 1, an exemplary computer system for implementing the present invention includes a conventional computer 20, including a processor 21, a system memory 22, and a system bus 23 that couples the system memory 22 to the processor 21. Although not shown in FIG. 1, the exemplary computer system for implementing the present invention may include additional processors, each of which are coupled to the system memory 22. In this alternative configuration, the additional processors are deemed to be adjunct processors capable of being dedicated to particular software processes concurrently executing within the computer 20.

The system memory 22 includes quickly-accessible random access memory (RAM) 25. The computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide non-volatile storage for the computer 20. Although the description of computer-readable media above includes the hard disk drive 27 and the optical disk 31, such as a CD, it should be appreciated by those skilled in the art that other types of media, which are readable by a computer, may also be used in each of the exemplary operating environments described with regard to FIG. 1.

A number of program modules may be stored in the drives 27, 30 and RAM 25, including an operating system 32 and a variety of other software program modules. In an embodiment of the present invention, an example of such software modules is a group of software modules collectively referred to as interactive information retrieval system modules 26 (IR system modules). The IR system modules 26 preferably include the following software modules:

one or more front end modules 33, one or more delivery modules 34, a middleware layer of software 38 for routing information and requests between others of the IR system modules 26, and a memory map module 39 (which interacts with a database 40 stored on the hard disk drive 27 or on the optical disk 31 in the optical disk drive 30).

When any of the IR system modules 26 are used (with the exception of the memory map module 39), the processor 21 may only bring a portion of the module into memory at a time due to the size of the module. For example, the operating system 32 and the database 40 are shown as residing within RAM 25. However, in the exemplary embodiment, only a portion of these software modules (with the exception of the memory map module 39) may be maintained within RAM 25 due to their prohibitive size. The software modules comprising the IR system modules 26 are discussed in greater detail below with regard to FIGS. 3, 6, and 8.

The operating system 32 provides the basic interface between the computer's hardware and software resources, the user, and the IR system modules 26. In the exemplary operating environments described with regard to FIG. 1, the operating system 32 is preferably a real-time operating system, such as the SOLARIS operating system, produced by SunSoft, a division of Sun Microsystems, Inc. A real-time operating system is desired in order to provide adequate response when searching and interacting with multiple users. The SOLARIS operating system has a multithreaded, real-time UNIX kernel capable of supporting symmetric multiprocessing. Those skilled in the art will appreciate the need for real-time, multithreaded performance in information retrieval applications in order to support an adequate level of transactional performance. Furthermore, those skilled in the art will be familiar with multiprocessing operating systems. Additional information regarding the SOLARIS operating system is available by reference to system manuals published by Sun Microsystems and other widely available literature on UNIX operating systems.

As with most conventional computer systems, a user may enter commands and information into the computer 20 through a keyboard (not shown) and an input or pointing device, such as a mouse (not shown). These and other input devices are often connected to the processor 21 through a serial port interface (not shown) connected to the system bus 23. A monitor (not shown) or other type of display device can also be connected to the system bus 23. In addition to the monitor, computers such as the computer 20 typically include other peripheral output devices (not shown), such as printers and backup devices.

In the exemplary embodiment, a user typically interacts with the computer 20 when the computer 20 functions in a server capacity. In this capacity, the computer 20 can service a remote programmable device (such as a remote computer 41), or a telecommunications device (such as a conventional telephone 42), each of which is logically connected to the computer 20.

The remote computer 41 may be a server, a router, a peer device, or other common network node. Typically, the remote computer 41 includes many or all of the elements described relative to the standalone computer 20. The logical connection between the remote computer 41 and the computer 20 depicted in FIG. 1 is a data communications network, such as a wide area network (WAN) 43. Other examples of data communications networks include enterprise-wide computer networks, intranets, or the global Internet. A communications interface, such as a network communications interface 44 in the computer 20, links the WAN 43 and the computer 20. However, the logical connections to the computer 20 may also be a local area network (LAN) (not shown) that is commonplace in offices. Typically, a user of the remote computer 41 interacts with the computer 20 via such logical connections in order to search the database 40 for information.

A telephony communication interface 45 (also known as a telephony line card) connected to a conventional public switched telephone network 46 (PSTN) provides the logical connection between the computer 20 and the conventional telephone 42. In this manner, the user can interact with the computer 20 with voice responses via a conventional telephone 42 or other telephonic device. In the preferred embodiment, the telephony communication interface 45 is a Model D/160SC-LS telephone line interface card having an Antares 2000 digital signal processing (DSP) card, both of which are manufactured by Dialogic Corporation of Parsippany, New Jersey. Both the network communications interface 44 and the telephony communication interface 45 are generally referred to as "communication interfaces" because the computer 20 provides the service of processing data inquiries through both of these interfaces. It will be appreciated that the network and telephone connections shown are exemplary and other means of establishing a communications link between the computer 20 and the remote computer 41 or conventional telephone 42 may be used.

As discussed earlier, the preferred embodiment of the present invention is embodied in the IR system modules 26 which are designed to operate in conjunction with SunSoft's SOLARIS operating system in a single processor computer system 20. However, one skilled in the art will quickly recognize that the invention may be implemented for use with other computer architectures, such as multiprocessor systems where threads are dedicated to distinct processors.

From this brief description, it should be appreciated that operating systems, such as the "SOLARIS" operating system, and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above.

Figure 3:
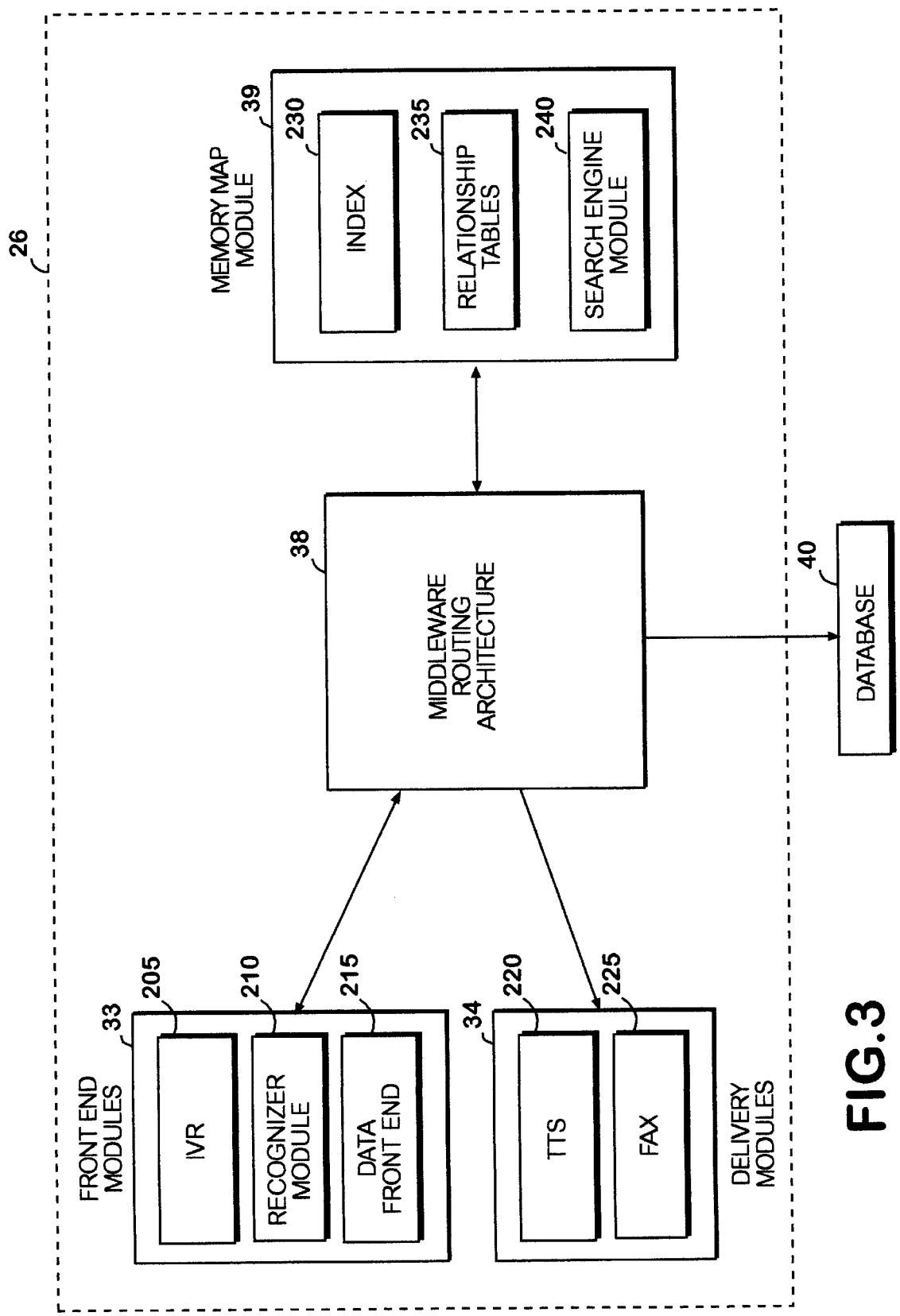
FIG. 3 is a diagram illustrating software components and their operative interrelationships in the exemplary embodiment of the present invention.
Figure 4:
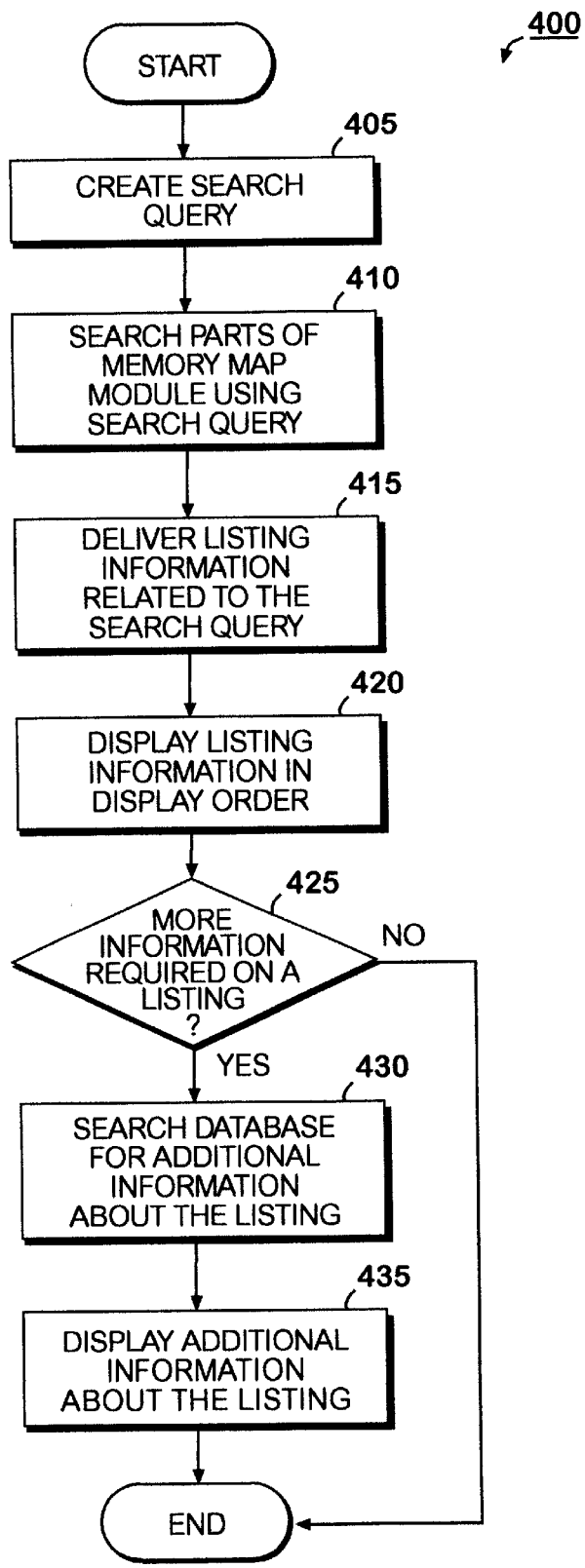
FIG. 4 is a flow diagram illustrating steps of an exemplary method for processing a memory map to provide information representing data within a database in accordance with an embodiment of the present invention.
Figure 6:
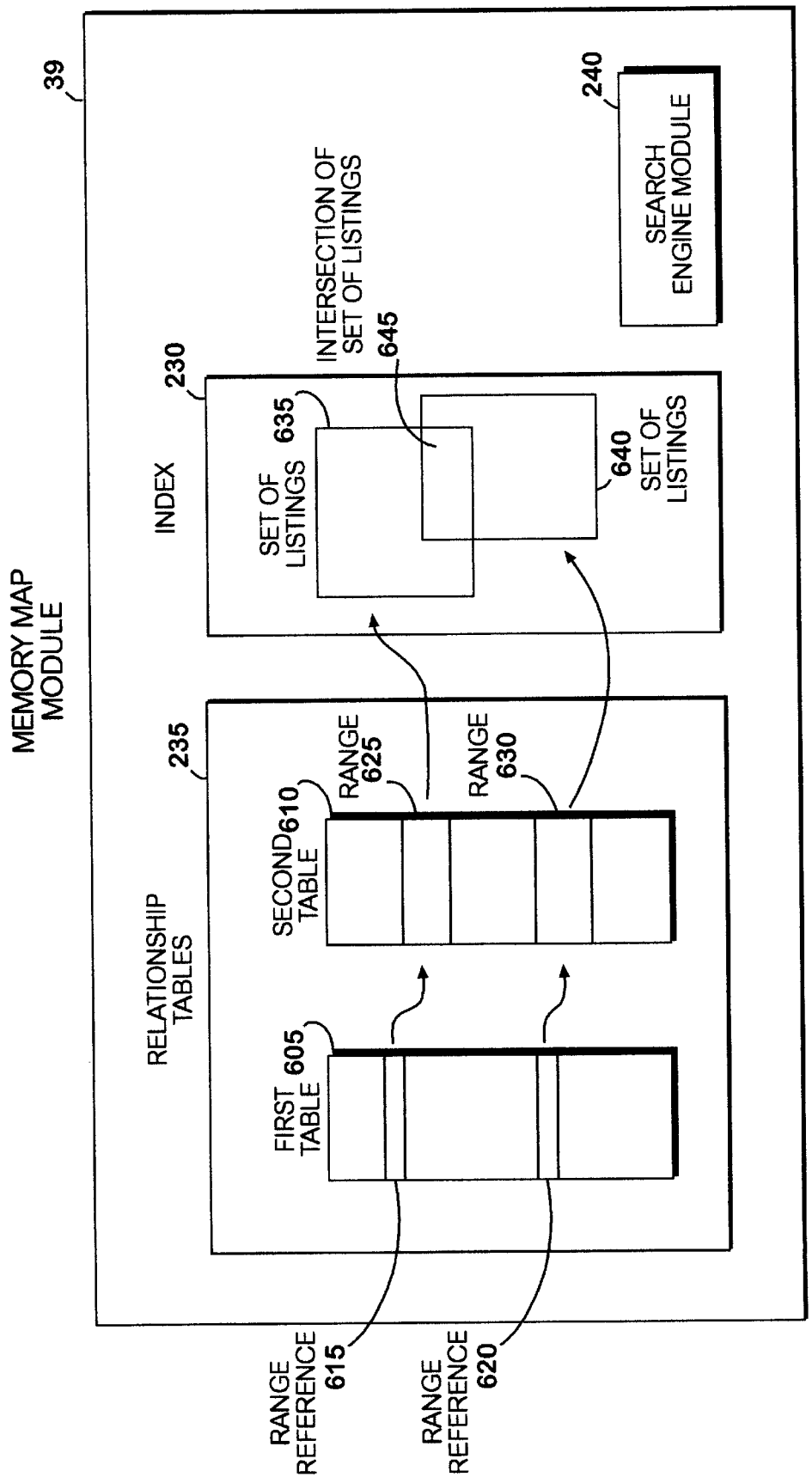
FIG. 6 is a diagram illustrating the contents of an exemplary memory map module, including a first table, a second table, and an index in one embodiment of the present invention.
Figure 7:
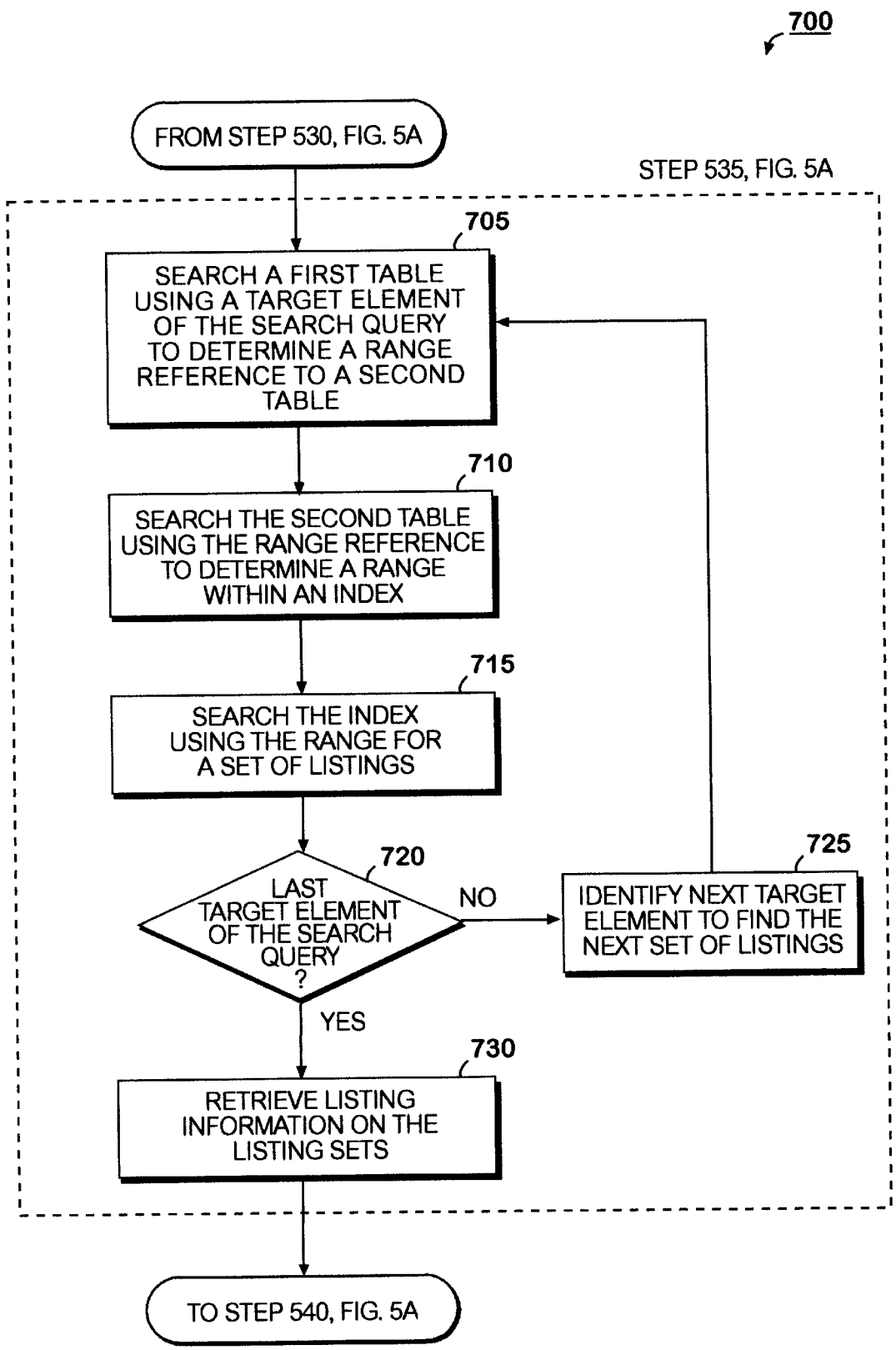
FIG. 7 is a flow diagram illustrating steps of an exemplary pointer/list method for searching parts of a memory map for listing information according to one embodiment of the present invention.
Figure 8:
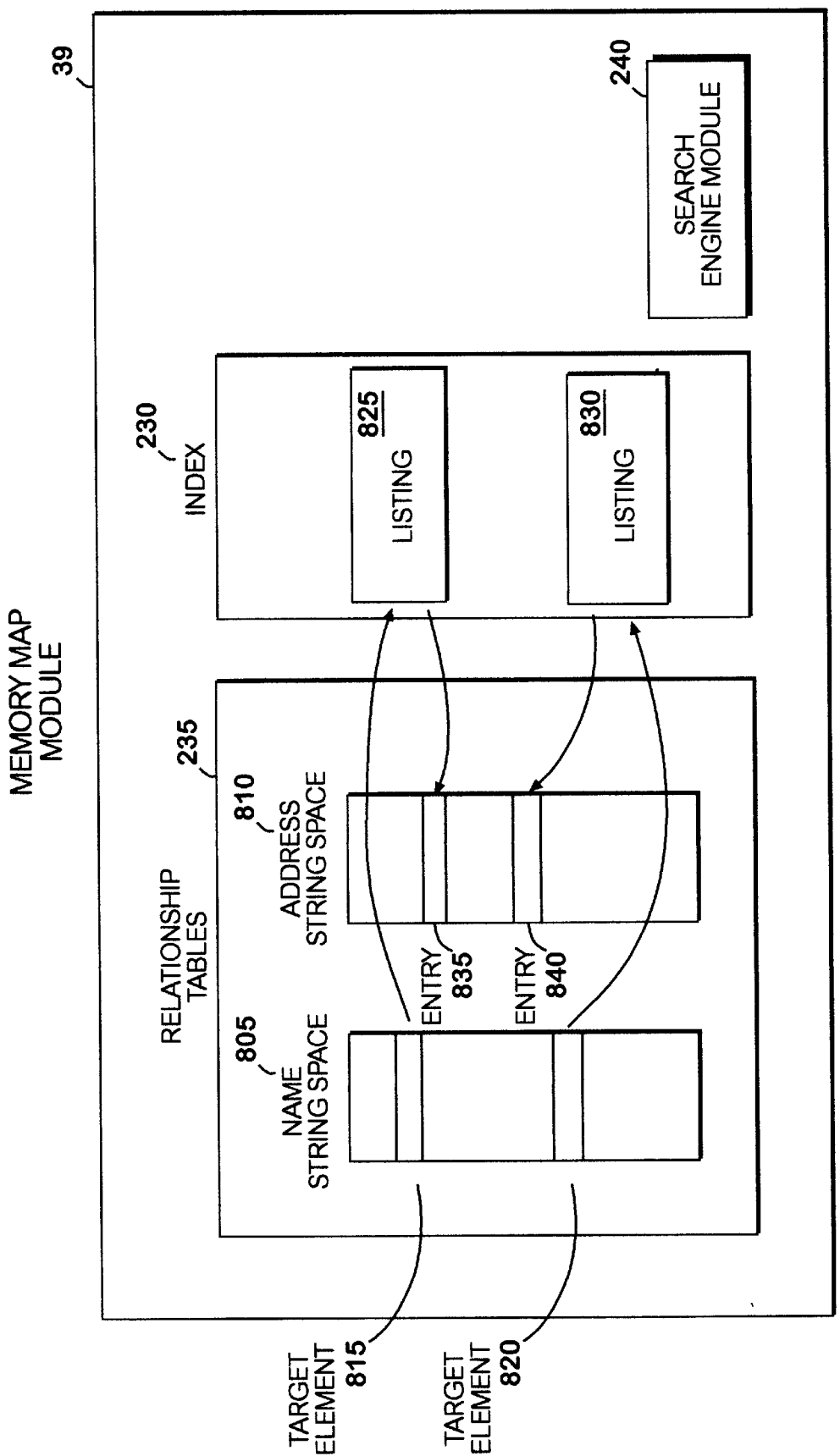
FIG. 8 is a diagram illustrating the contents of an exemplary memory map module, including a name string space, an address string space, and an index in another embodiment of the present invention.
Figure 9:
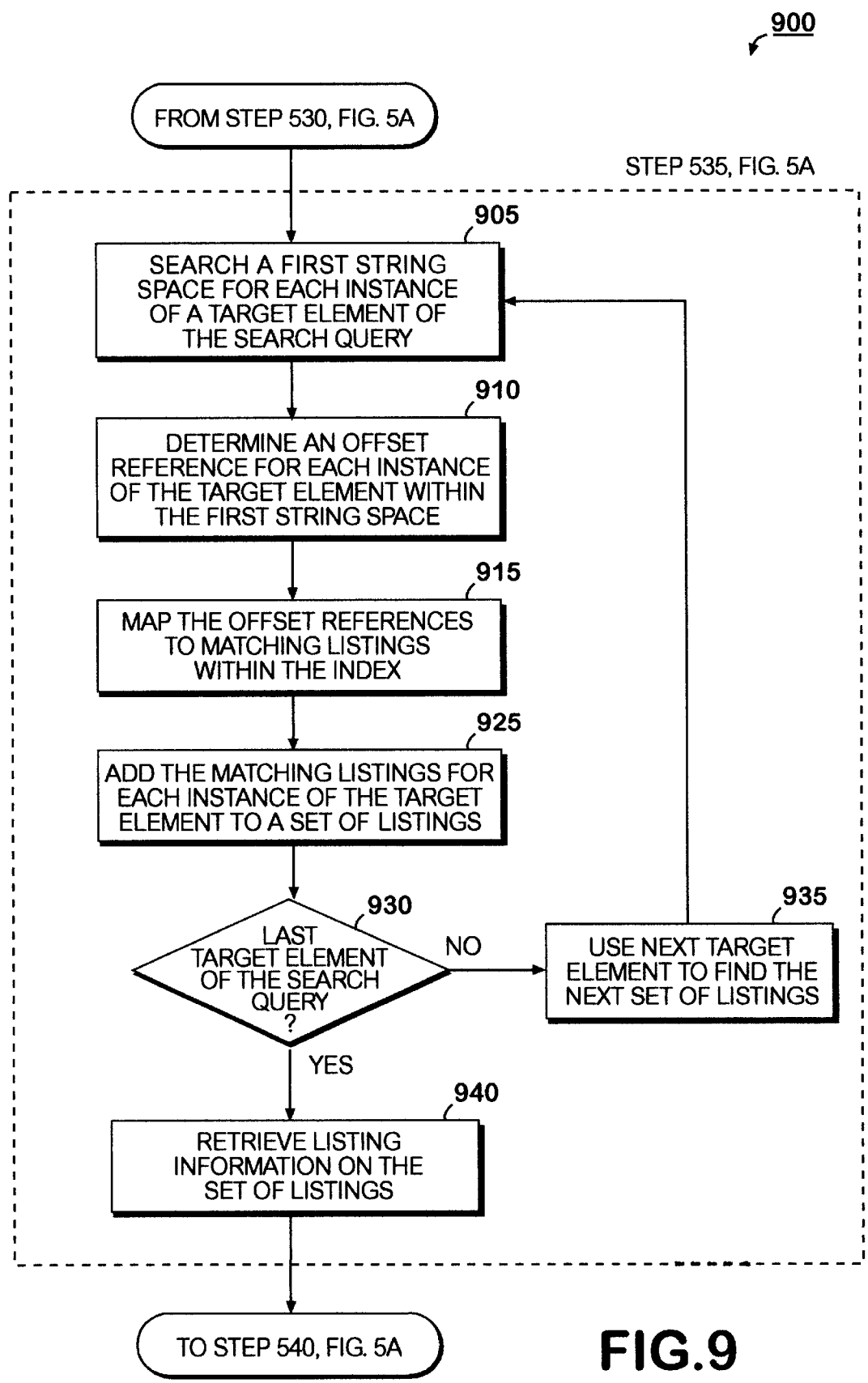
FIG. 9 is a flow diagram illustrating steps of an exemplary reverse mapping method for searching parts of a memory map for listing information according to another embodiment of the present invention.

Turning now to the remaining figures, an exemplary embodiment of the present invention is described. FIGS. 2A–2E illustrate a user's perspective when using an embodiment of the present invention utilizing a memory map. FIG. 3 is a diagram illustrating the memory map and its interrelationships with other software components in the exemplary embodiment of the present invention. FIGS. 4 and 5 are flow diagrams illustrating exemplary steps for processing the memory map to provide information representing data within a database. FIGS. 6 and 7 support an embodiment of the present invention using the pointer/list method for searching the memory map. FIGS. 8 and 9 support an embodiment of the present invention using the reverse mapping method for searching the memory map.

User's Perspective when using an Embodiment of the Present Invention

As previously mentioned, a user may interact with the computer 20 via a data communications network, such as the WAN 43. In an embodiment of the present invention, the user's interaction with the computer 20 can be illustrated with UI screen shot diagrams of what the user would see on the monitor of the remote computer 41 when using the embodiment of the present invention. The example illustrated by FIGS. 2A–2E involves searching for information maintained within an online database of classified advertising information or data. As will be described in more detail below, the majority of a user's interaction with the embodiment of the present invention involves selecting parts (also known as target elements) of a search query.

Figure 2A:
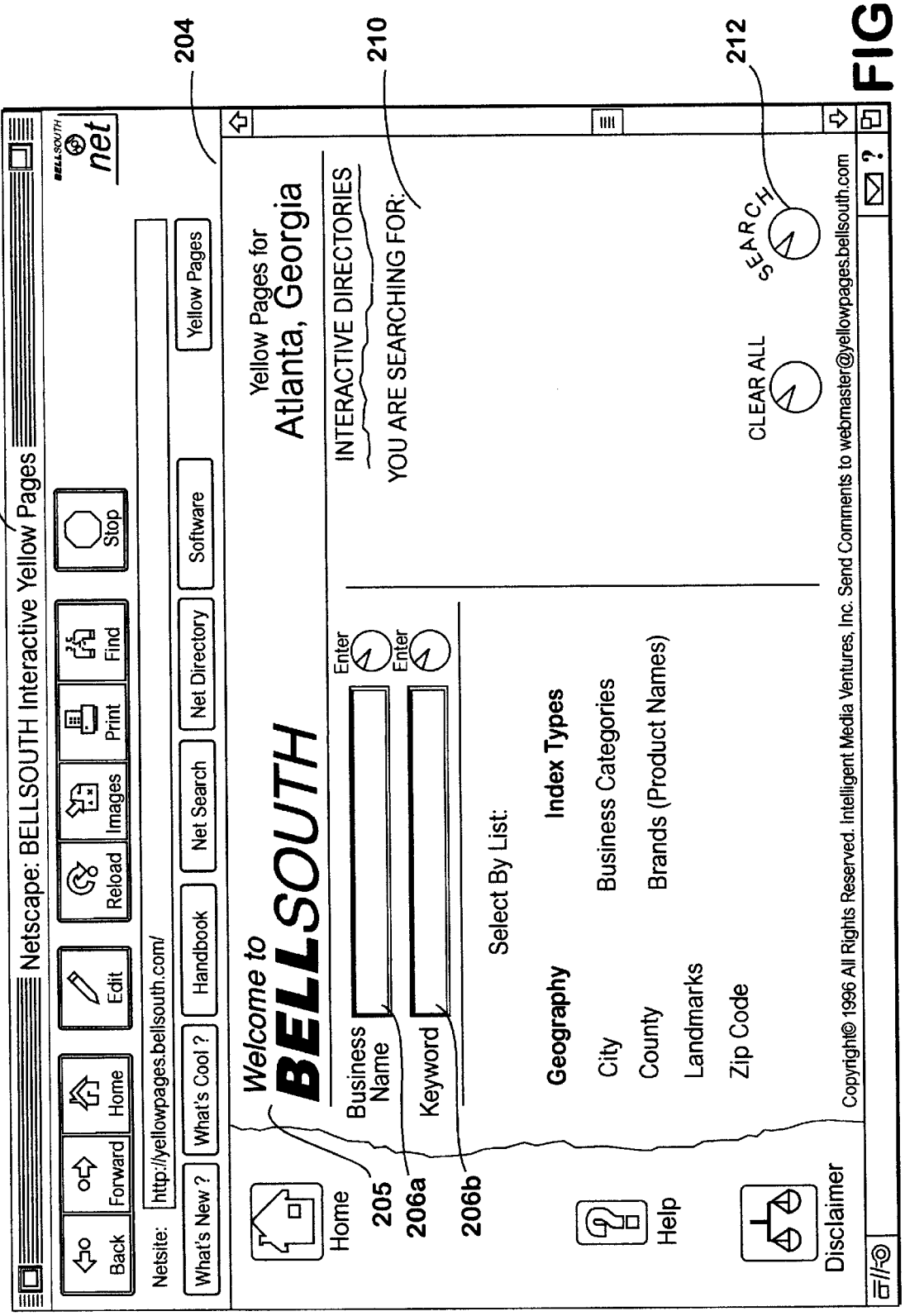

Referring now to FIG. 2A, a window 202 appears on the monitor of the remote computer 41. In this example, the window 202 is controlled by a browsing program module, such as the Netscape "NAVIGATOR" browsing software marketed and distributed by Netscape Communications, Inc. Those skilled in the art will realize how the browsing program module resident on and operating within the remote computer 41 is able to communicate with one of the front end modules 33 within the other computer 20. The browsing program module controlling the window 202 displays a content section 204 for the content being generated by one of the front end modules on the computer 20. In this manner, the browsing program module on the remote computer 41 acts as a searching window into data stored within the other computer 20.

Figure 2B:
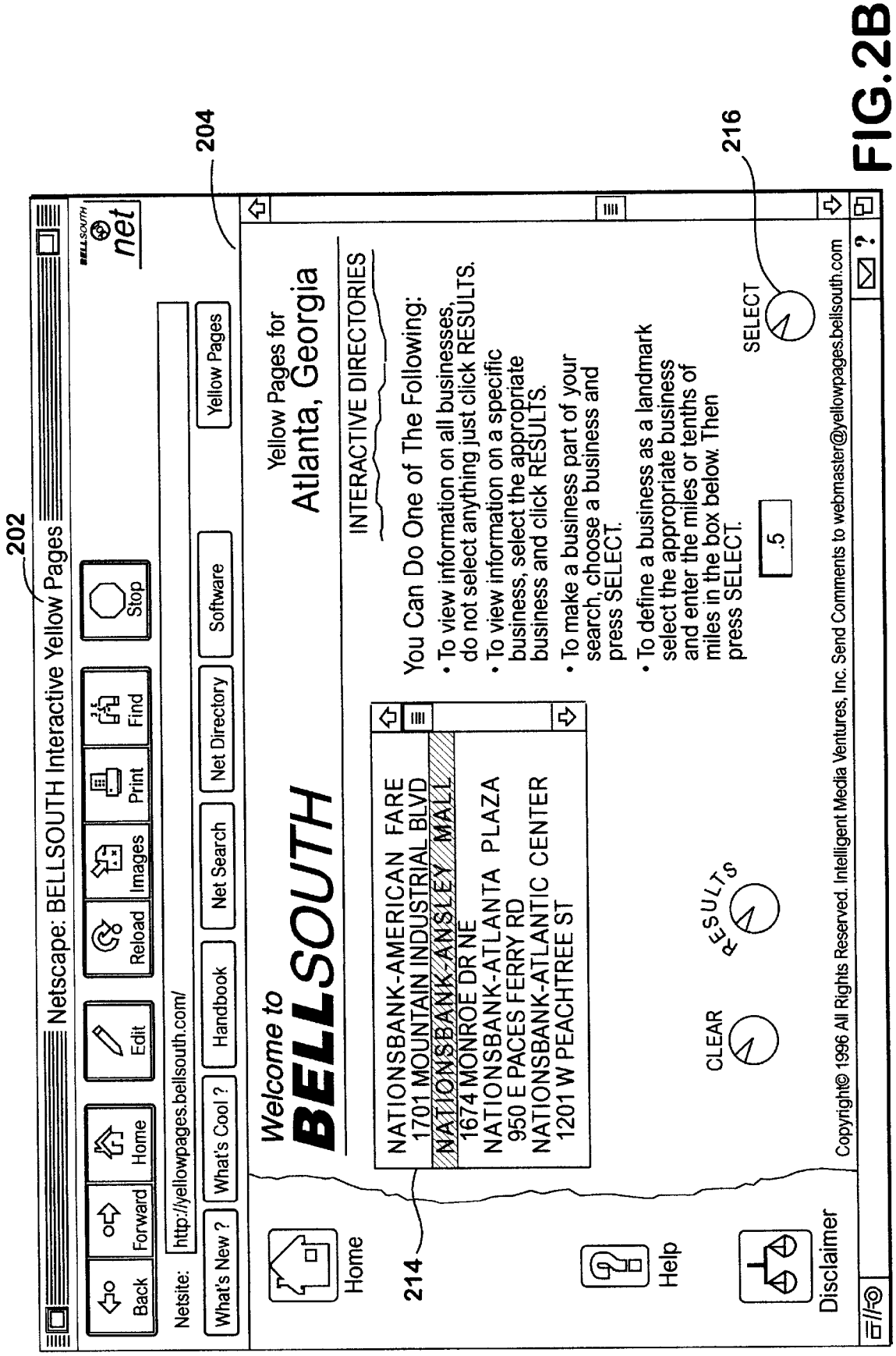

Within the content section 204, the user is presented with a search query entry form 205 as illustrated in FIG. 2A. The user typically interacts with the other computer 20 by filling out selection fields 206a–b within the search query entry form 205 in order to build or create a search query. The user is able to type in elements of the search query. For example, the user may type in a business name in the business name selection field 206a and then may type in a particular keyword in the keyword selection field 206b. FIG. 2B is a screen display that would appear to the user if the user typed in a particular business name in the business name field 206a.

Turning now to FIG. 2B, a target element selection list 214 appears within the content section 204 when there is more than one listing within the database corresponding to what has been typed into one of the selection fields 206a–b. For example, if the word "NATIONSBANK" is typed into the business name field 206a and there is more than one listing of "NATIONSBANK", then the target element selection list 214 would reflect the different listings having the business name "NATIONSBANK". If the user merely wants to select the name "NATIONSBANK" as one of the target elements for the search query, the user would select the Select button 216. The word "NATIONSBANK" would then appear within the target element column 210 (FIG. 2A).

Figure 2C:
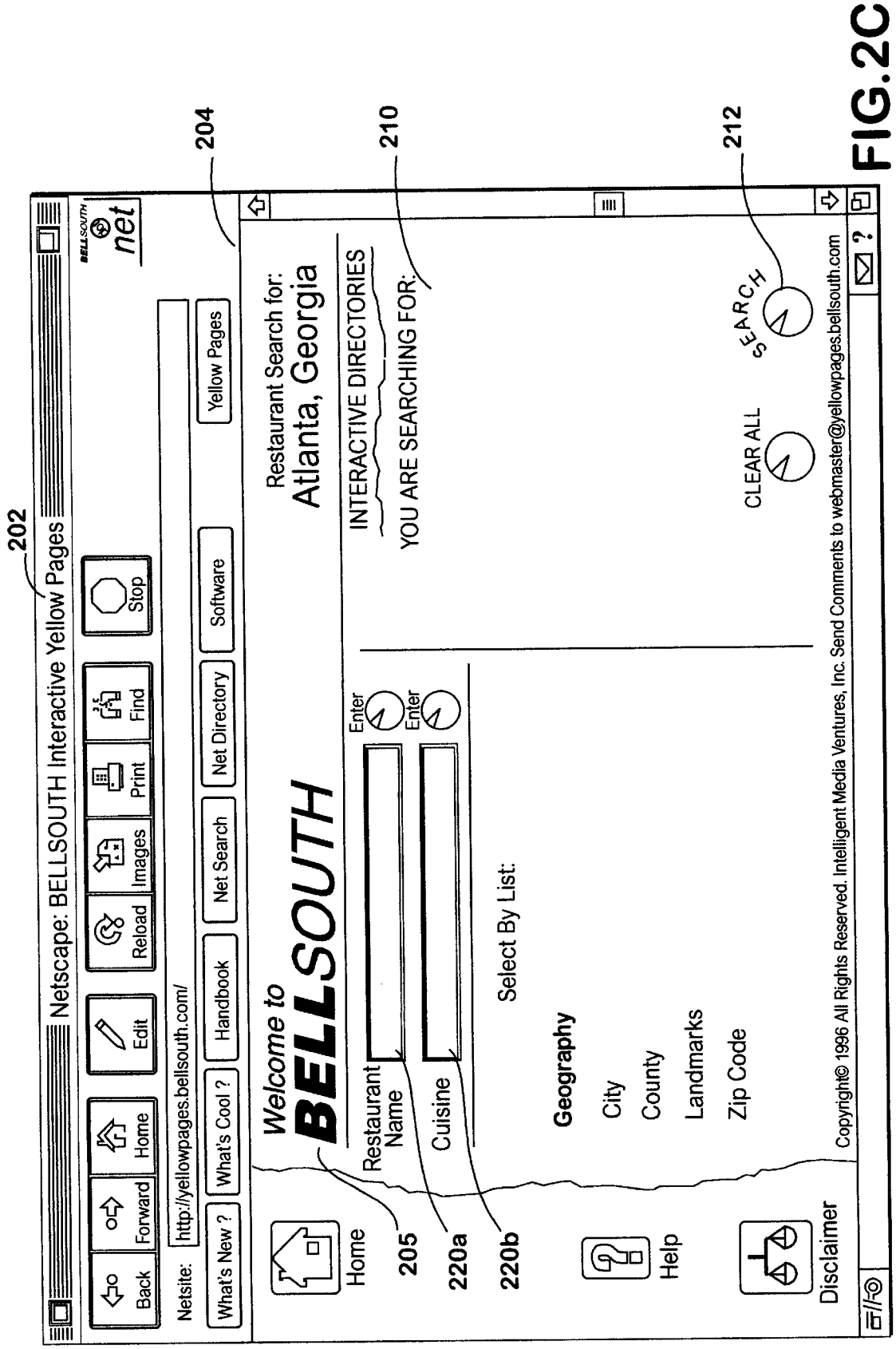

While the example above uses business names and key words as categories of target elements, other selection fields are also available to the user when creating a search query. Referring now to FIG. 2C, a restaurant selection field 220a and a cuisine selection field 220b may also be presented to a user when performing a search for information stored in the database. The user may type in the name of a desired restaurant in the restaurant selection field 220a. If so, the name of the desired restaurant is first checked to see if it is a valid name. If the name of the desired restaurant is a valid name within the database, the name of the desired restaurant appears within the target element column 210 (FIG. 2A). The user may also define the search parameters by selecting a type of cuisine within the cuisine selection field 220b.

Figure 2D:
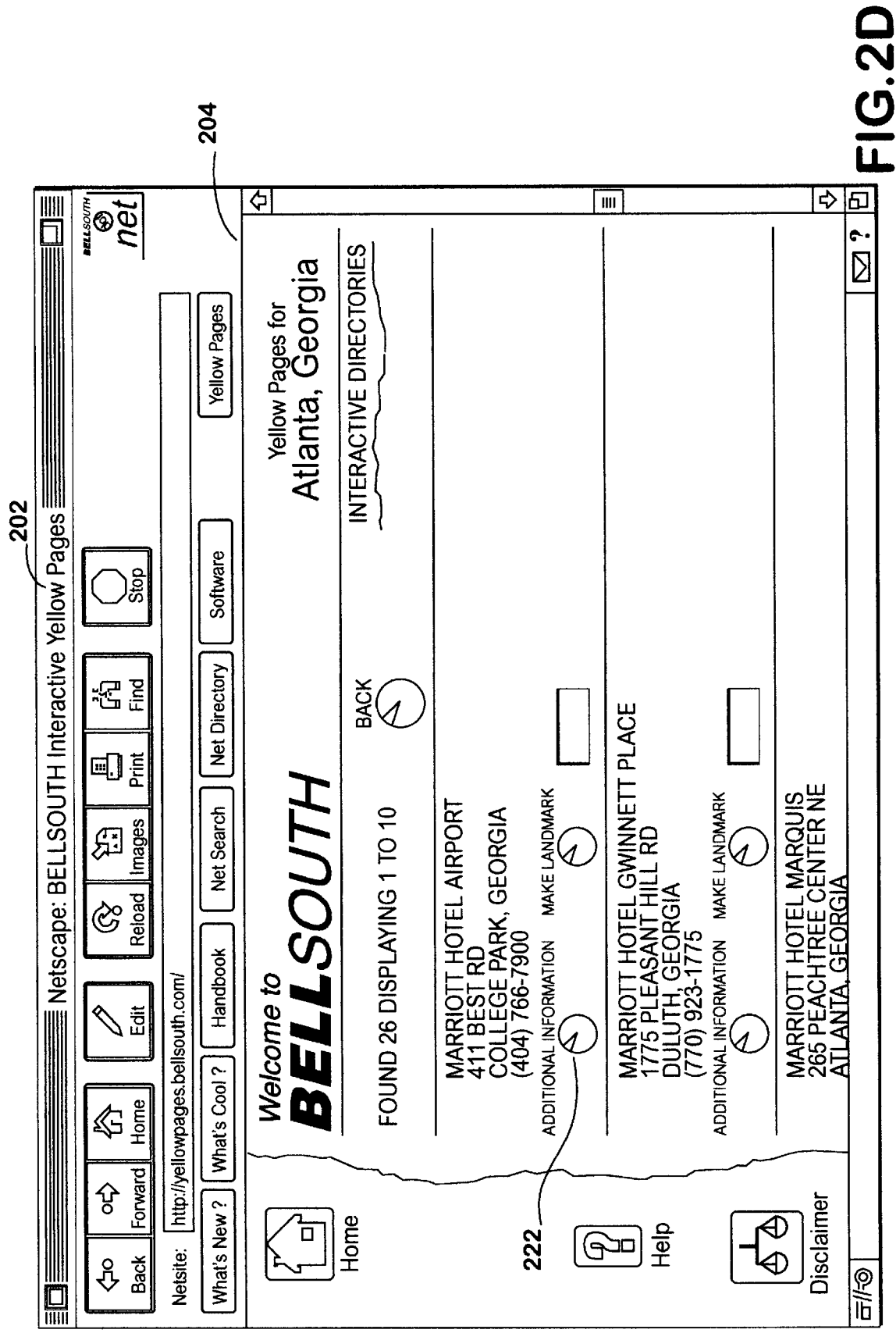

Once all of the desired target elements of the search query have been selected, the Search button 212 (FIG. 2A) may be selected. In response to the selection of the Search button 212, a search is initiated to find some limited information, also called listing information, related to the search query. The listing information is related to the target elements of the search query. FIG. 2D is a UI screen shot of some example listing information.

Referring now to FIG. 2D, the example listing information shows listing information about various hotels. In order for the search to provide such results, the user filled out the business name selection field 206a with the word "MARRIOTT HOTEL", which then appeared as the target element within the target element column 210. Upon selecting the Search button 212, a search for listing information related to "MARRIOTT HOTEL" is initiated.

The search processes a memory map, which is a special type of data structure, to quickly perform the search for the limited listing information about the data within the database. The memory map is essentially an allocated part of system memory comprising an index of data within the database and relationship information about the data. Using such a memory map saves a large amount of memory space in RAM 25 when compared to having the whole database within RAM 25. Additional details regarding the memory map are discussed below with regard to FIGS. 3–9.

When the listing information is displayed to the user, the listings appear in a predetermined order. For example, in the preferred embodiment, the display order is dependent upon whether the listing is associated with a paying advertiser. Thus, the preferable display order for listings is (1) paying advertisers in alphabetical order and then (2) non-paying listings in alphabetical order. However, the display order may be any order or may be dynamically selected by the user prior to initiating a search.

Referring now to FIGS. 2D and 2E, if the user needs additional information for a particular listing beyond what is provided in the delivered listing information, the user selects an "Additional Information" button 222. Upon selection of the "Additional Information" button 222, a focused search is then performed. The focused search searches the database itself, as opposed to searching and processing the memory map. In this manner, the focused search retrieves the full information or data about the particular listing from the database, as is illustrated in FIG. 2E.

In summary, the user is exposed to a variety of fill-in-the-blank type of forms and selection displays when building the search query. Once the search query has been built, a search is initiated. Processing the search involves processing a memory map associated with the database in order to quickly deliver listing information to the user. In this manner, the database is only searched and processed when absolutely necessary and then only for a focused search for a particular listing. Thus, the user is provided with an advantageously rapid response to a search query using embodiments of the present invention.

The Software Modules of the IR System Modules

Behind the user interface illustrated in FIGS. 2A–2E, the software modules of the IR system modules 26 are responsible for searching and processing the memory map module

39 to provide listing information to a user. During selection of target elements for the search query, the front end modules 33 receive the user's selections of target elements. Each target element is pre-validated by sending a message to the memory map module 30. Pre-validating uses the memory map in this fashion to assure that the target element has data corresponding to the target element within the database. Once all target elements are selected, the memory map module 39 is searched or processed to provide the listing information related to the target elements. The listing information is then sent from the memory map module 39 to the user via the middleware 38 and one of the delivery modules 34. FIG. 3 is more detailed diagram illustrating a memory map module 39 and its operative interrelationships to other software components in the preferred embodiment of the present invention.

The Memory Map Module

Turning now to FIG. 3, the middleware 38 (also known as the middleware routing architecture) connects various front end modules 33 and delivery modules 34 to the memory map module 39 within the IR system 26. The memory map module 39 includes an index 230, relationship tables 235, and a search engine module 240, each of which are used to provide the listing information.

The memory map module 39 is an allocated portion of system memory 22. In the exemplary embodiment, the memory map module 39 is preferably created with the mmap UNIX system call. The mmap UNIX system call allocates a portion of available memory to be a quickly accessible data structure. More particularly stated, the mmap UNIX system call allows access to the allocated data structure using address space manipulations instead of a conventional read/write interface. Once an object or file has been mapped into such a data structure using the mmap UNIX system call, a process thread merely uses the data at the address to which the object was mapped in order to access the object. Those skilled in the art will be familiar with typical UNIX system calls. Additional information regarding the exact syntax of the mmap system command supported by the SOLARIS operating system is available in the online "man pages" of the SOLARIS operating system and in published manuals that accompany the SOLARIS operating system.

As a quickly accessible data structure, the memory map module 39 essentially provides a structured guide to the data within the database 40 along with some extracted information about the data within the database 40. More particularly, the memory map module 39 provides an index 230 to data within the database 40 along with relationship information, provided within relationship tables 235, about the data within the database 40.

The index 230 is the structured guide or tool associated with the database 40. In the exemplary embodiment, the index 230 contains elements, also known as keywords and categories, within individual listings relating to individual data records within the database 40. Typically, these keywords or categories are referenced by numeric identifiers, such as account numbers.

Furthermore, the index 230 may also include geographic elements for a listing and display numbers for a listing. Geographic elements associate a listing with a city, county, community, street name, or other geographical feature. A display number, also referred to as a randomization number, is used to determine the display order in which an individual listing is displayed to the user. In one embodiment of the present invention, the display order is a predetermined order of the listings depending on the display numbers and the nature of the listing. For example, in the exemplary embodiment where the database contains classified advertising data, the predetermined display order is established to display listings of paying advertisers first in alphabetical order and then display listings of non-paying advertisers in alphabetical order. In another embodiment of the present invention, the display order is randomized. Using the randomized display order, the listings are randomly displayed to the user without regard to paying or non-paying status or alphabetical relationship to each other.

In the example where the database 40 contains classified advertising data, the index 230 may include, amongst other things, the categories and identifiers as listed in Table 1 below:

TABLE 1

| Category Description | Category Type within Index | Numeric Identifier of Category |
|---|---|---|
| Attorneys | LOB | 105 |
| Buckhead | Community | 37 |

Referring now to Table 1, "Attorneys" and "Buckhead" are each a description of a category by which the information within the database 40 may be organized. Each of these categories is one of a predefined type of category within the Index 230. As previously mentioned, each category is referenced by a distinct numeric identifier. For example, the Attorneys category is a LOB (Line of Business) type of category having numeric identifiers of 1730 for the LOB type of category and 105 for Attorneys. The Buckhead category is a community type of category having numeric identifiers of 21274 for the community type of category and 37 for Buckhead.

If the user desires to use the IR system modules 26 to search for attorneys located within the Buckhead community, an exemplary search query would include the above two listed categories and their respective identifiers as target elements of the search query. The elements in such an exemplary search query would be as follows: 1730 105, 21274 37.

In addition to the index 230, the memory map module 39 includes the relationship tables 235. The relationship tables 235 maintain relationship information defining the data-to-data relationship of the data within the database 40. The data-to-data relationship can be defined in a number of different ways in order to be useful when searching the memory map module 39 for information related to data within the database 40. The way in which the relationship information is used during processing of the memory map module 39 is described in more detail below with regard to FIGS. 6–9.

The memory map module 39 also includes the search engine module 240. While it is most advantageous to process and search the memory map module 39 (a quickly accessible data structure) without searching the database, there are times when additional information about a listing is required or requested. In such a situation, the search engine module 240 is able to formulate an appropriately narrow search request for the database 40 in order to retrieve the database data.

In embodiments of the present invention, the index 230 and the relationship tables 235 are both associated with a particular database 40. The index 230 and the relationship tables 235 are created based upon the data and structure of the data within the database 40. In the exemplary embodiment, the database 40 is a SYBASE database that is CODASYL (Conference on Data Systems Language) compliant. CODASYL compliance requires a specific hierarchical structure of a database. Those skilled in the art will be familiar with structured databases, such as CODASYL compliant databases. Additional information regarding CODASYL compliance is available from widely available published sources on structural databases. While the database 40 in the exemplary embodiment is CODASYL compliant, those skilled the in art will also recognize that the principles of the present invention are not limited to CODASYL compliant databases.

Interaction Between Software Modules within the IR System

Given the above preface on the memory map module 39 and the functionality of individual software modules within the IR system modules 26, the following provides a description of how the IR system modules 26 interact with each other in an embodiment of the present invention. Returning now to FIGS. 1–3, the following describes the interaction of the software modules within the IR system 26 when the search query is created and transmitted to the memory map module 39, when the memory map module is searched, and when the results of the search are transmitted back to the user.

Selecting Target Elements for a Search Query

As previously discussed, a user selects target elements when creating a search query. For example, the user may select "Attorneys" and "Buckhead" as target elements when the user wants to find an attorney within the Buckhead community of Atlanta, Ga.

A user begins selecting the target elements by communicating with the computer 20 via the conventional telephone 42 or via the remote computer 41. More particularly, the user communicates information defining the target element of the search query to one of the front end modules 33 of the IR system 26 via one of the above-described communication paths. If the communication path is via the PSTN 46, the module receiving the information may be an interactive voice response (IVR) module 205 and the recognizer module 210. However, if the communication path is via the WAN 43, the module receiving the information may be the data front end module 215.

As each target element is selected by the user, the target element is pre-validated by the memory map module 39 to determine if the target element is associated with any data within the database 40. This allows the user to create a search query knowing that there is available data within the database 40 related to parts of the search query.

During the pre-validation process, the front end module 33 receives the information defining the target element. In response to receiving the information, the front end module 33 formats the information into a message packet. The front end module 33 transmits the message packet to the middleware 38 where the parts of the packet are read and interpreted. Once interpreted, it is determined that the message packet is a pre-validation request for a particular target element. The middleware 38 also determines that the message packet should be sent to the memory map module 39.

Once the memory map module 39 receives the pre-validation request, the parts of the memory map module 39 are used to determine if the target element is active. More particularly stated, the memory map module 39 refers to the index 230 (not the database 40) in order to determine whether the target element has related data available within the database 40. The answer to this pre-validation search is then sent back to the appropriate front end module 33 through the middleware 38.

Processing a Search Query by the IR System

Once the target elements of the search query have been selected, a message packet with the pre-validated target elements of the search query is sent via the middleware 38 to the memory map module 39. Once the memory map module 39 receives the search query message packet, the memory map module 38 is searched or processed using the search query to determine listing information related to the search query. More detailed steps used in processing the memory map module 39 to provide the listing information are described in below with regard to FIGS. 7 and 9.

Delivering Search Results by the IR System

The process of sending the resulting listing information back to the user is similar to the process of sending the search query to the memory map module 39. Another message packet is created with the listing information and is addressed to one of the delivery modules 34. The message packet is sent to the middleware 38 where it is interpreted and transmitted to the appropriate delivery module 34, such as a text-to-speech (TTS) module 220 or a fax module 225. Once the appropriate delivery module 34 has received the message packet, the resulting listing information may be transmitted to the user in the format corresponding to the appropriate delivery module 34.

Requesting Additional Information on a Listing

Upon receiving the listing information, if the user determines that more information about a particular listing is desired, then the user communicates a search request to the appropriate front end module 33 for the additional listing. The appropriate front end module 33 formulates another message packet with the search request. This message packet is then sent to the memory map module 39 via the middleware 38. Once the memory map module 39 receives the search request, the search engine module 240 within the memory map module 39 initiates a search of the database 40. However, the search is very narrowly focused for the data related to the particular listing. In this way, the need to retrieve data from the database 40 (a relatively slow process) is minimized by searching the memory map module 39 first (a faster process) when providing just listing information.

In summary, the memory map module 39 is a software module used to advantageously provide listing information related to data within the database 40. The memory map module 39, in conjunction with its component parts (the index 230 and the relationship tables 235), is typically processed or searched in order to provide such listing information. The preferred steps involved in processing the memory map module 39 according to various embodiments of the present invention are described in more detail below with regard to FIGS. 4, 5, 7, and 9.

Flow Diagrams on Use of the Memory Map Module

In the context of the above described software modules of the IR system modules 26, exemplary steps for searching and processing the memory map module 39 to provide listing information to a user are described below with regard to FIGS. 4 and 5. FIG. 4 is a flow diagram illustrating steps of an exemplary method for processing a memory map to provide information representing data within a database in accordance with an embodiment of the present invention. FIG. 5 is a more detailed flow diagram illustrating more detailed steps of an exemplary method for processing a memory map to provide information representing data within a database in accordance with an embodiment of the present invention.

Turning now to FIG. 4, the method 400 begins at step 405 where the search query is created with one or more target elements. Each target element is identified and selected by the user. Each target element is typically pre-validated to verify that there is data in the database 40 related to the target element. For example, if the user selects "Attorneys" to be a target element, the "Attorneys" target element is typically pre-validated against the data within the database 40. This enables the user to create a search query with active target elements that prove useful in a search.

At step 410, the search query is used to search parts of the memory map module 39. Typically, the parts of the memory map module 39 used are the index 230 and the relationship information within the relationship tables 235. The memory map module 39 is processed and searched by finding sets of listings related to each target element of the search query using the index 230 and the relationship information.

In an example where the user wants to find attorneys in the Buckhead community, one set of listings would relate to the "Attorneys" target element and another set of listings would related to the "Buckhead" target element. With multiple target elements and their respective listing sets, the listing sets are intersected or joined according to the logic within the search query into what is called listings of the intersection. The listings in the intersection are ordered. Listing information about each of the listings in the intersection is found (preferably within the memory map module 39) and delivered as the listing information related to the search query at step 415.

At step 420, the listing information is displayed to the user in a display order. This display order may be random or it may be a distinct predetermined order. For example, in the exemplary embodiment, the listing information is displayed according to whether the listing related to a paying or non-paying advertiser.

At step 425, if the user desires more information on a particular listing, step 425 proceeds directly to step 430 where the database is searched for the additional information about the particular listing. In the hotel example from FIGS. 2A–2E, if the user desires more information about one of the hotel listings displayed on FIG. 2D, then the database 40 is searched by the search engine module 240 for more information about the particular hotel listing.

At step 435, the data found within the database search about the particular hotel listing is displayed as the additional information, as illustrated in FIG. 2E, and then the method 400 ends. However, if the user does not desire more information on any of the listings displayed back at step 420, then the method 900 ends after step 425.

Figures 5A, 5B:
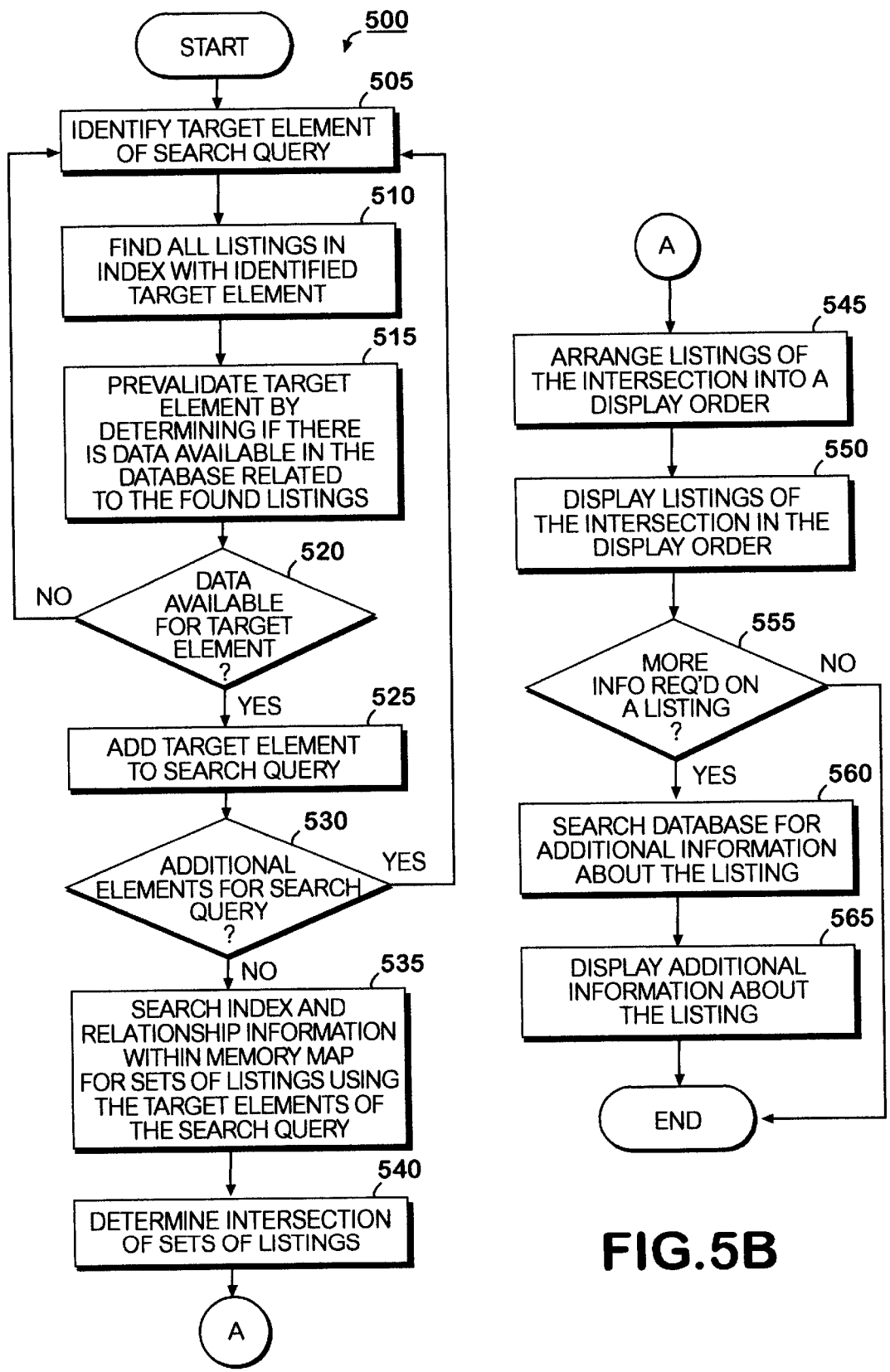
FIG. 5, consisting of FIGS. 5A and 5B, is a detailed flow diagram illustrating steps of an exemplary method for processing a memory map to provide information representing data within a database in accordance with an embodiment of the present invention.

FIG. 5 is a more detailed flow diagram illustrating more detailed steps of an exemplary method for processing a memory map, such as the memory map module 39. Turning now to FIG. 5A, the method 500 begins at step 505 by identifying a target element of the search query. As previously discussed, a target element is typically identified or selected via user inputs within selection fields, such as the business name selection field 206a shown in FIG. 2A.

At step 510, all of the listings within the index 230 having the target element are found. At step 515, the target element is pre-validated by determining if there is data available within the database 40 related to any of the listings.

At step 520, if data is available for any of the listings related to the target element, then step 520 proceeds directly to step 525 where the target element is added to the search query. In such as situation, the user would see the target element appearing within the target element column 210 as illustrated in FIG. 2A.

However, if there is no data available for any of the listings related to the target element, step 520 proceeds back to step 505 to identify another target element. In such a situation, the target element is not added to the search query because the target element is not useful for a search when there is no data available corresponding to the target element.

At step 530 after step 525, if additional elements are desired for the search query, step 530 proceeds back to step 505 to identify the next target element of the search query. Otherwise, step 530 proceeds directly to step 535.

At step 535, the index 230 and the relationship information (represented by the relationship tables 235) within the memory map module 39 are searched. The focus of the search is to find sets of listings (also called listing sets) associated with the target elements of the search query. By searching within the memory map module 39 instead of within the database 40, the search is much quicker. In the exemplary embodiment, the search and processing of the memory map module 39 is typically 100 to 1000 times faster than a search of the database 40 because the memory map module 39 is quicker to access in memory. The search and processing of the memory map module 39 is also faster than a search of the database 40 because the memory map module 39 is typically much smaller than the database 40. For example, in the exemplary embodiment, the memory map module 39 is approximately 40 Megabytes when compared to the 2 Gigabyte classified advertising database 40. Two embodiments of the step of searching the index 230 and relationship information for sets of listings are further described in even more detail in FIGS. 7 and 9.

At step 540, if the search query has more than one or a plurality of target element, the intersection of the sets of listings is determined. In the exemplary embodiment, it is preferable to determine the intersection of the listing sets beginning with the listing set having the fewest number of listings. When this listing set is compared to other listing sets, the time it takes to determine the intersection of the listing sets is advantageously reduced.

At step 545, the listings within the intersection are arranged into a display order. As previously described, the display order may be random or may be according to a predetermined rule. In the exemplary embodiment, the listings from a search of the memory map module 39 are preferably in a predetermined order. This predetermined order has the listings associated with paying advertisers in alphabetical order coming first followed by the non-paying advertisers in alphabetical order.

At step 550, the listings of the intersection are displayed in the display order. More particularly, listing information about each of the listings within the intersection is displayed to the user. In the exemplary embodiment, the listing information is maintained within the memory map module 39. In this manner, the listing information related to the database's data is retrieved without having to incur the time to search the actual database 40.

However, in another embodiment of the present invention, the memory map module 39 may not store enough information about the listing to provide a sufficient amount of listing information to the user. In such a situation, after determining the intersection of listings and prior to displaying the listing information, limited information about each of the remaining listings may be found via a narrowly focused search of the database 40. This limited information is then deemed to be the listing information for each of the remaining listings.

At step 555, if the user desires more information on a particular listing displayed at step 550, step 555 proceeds directly to step 560 where the database 40 is searched for the additional information about the particular listing. Otherwise, the method 500 ends after step 555.

At step 565 after step 560, the data found within the database search about the particular listing is then displayed as the additional information and then the method 400 ends.

Pointer/List Intersection Embodiment

An aspect of the present invention relates to the method of searching and processing the memory map module 39 in response to a search query (step 535 of FIG. 5A). In one embodiment of the present invention, the memory map module 39 is searched and processed using a pointer/list method. In the pointer/list method, the contents of the relationship tables 235 are utilized as pointers to ranges within the index 230 where the appropriate sets of listings are located. In this way, the listings (e.g., the appropriate sets of listings) can be quickly identified based upon the relationship information (e.g., the pointers and the ranges). FIG. 6 is a diagram illustrating the contents of the relationship tables 235 according to the pointer/list method of searching the memory map module 39. FIG. 7 is a flow diagram illustrating the preferred steps for searching the memory map module 39 using the pointer/list method.

Turning now to FIG. 6, the memory map module 39 and its components are illustrated. More particularly, the index 230 and the relationship tables 235, comprising a first table 605 and a second table 610, are shown. For a given target element of the search query, the target element is preferably defined with a type code that functions as a pointer. The pointer identifies a location 615 within the first table 605. At the location 615 within the first table 605 is a range reference. The range reference is a pointer to a range within the second table 610. The range preferably comprises an offset into the second table 610 and a length after the offset. At the location 625 defined by the range reference (e.g., the offset and the length) within the second table 610 is the range. The range is a pointer to a section of the index 230. More particularly stated, the range defines a group or set of listings 635 within the index 230. The range is preferably an offset into the index 230 and length after the offset. In this fashion, the range defines the set of listings 635.

In this embodiment of the present invention, the set of listings 635 contains listings, each of which preferably comprise a unique numeric identifier (also called a list account number) along with a display number amongst other information. The listing information about each listing is preferably maintained within the index 230. In this way, the listing information for each listing in the set of listings 635 may be obtained without searching the database 40. Alternatively, it is contemplated that the search engine module 240 may perform a narrow and focused search to provide the listing information for each listing in the set of listings 635.

If the search query has more than one or a plurality of target elements, then a similar process is performed for each of the target elements to provide another set of listings 640 corresponding to each of the target elements. The intersection 645 of these sets of listings 635, 640 provides the listing information related to the search query's target elements.

For example, if the search query was to find attorneys in the Buckhead community, a first target element is "Attorneys" with a type code of 105. The second target element of the search query is "Buckhead" with a type code of 37. Regarding the "Attorneys" target element, the type code of 105 functions as a pointer into the first table 605. At a location 620 designated by the type code of 105, a range reference is maintained. This range reference preferably provides an offset into the second table 610 and a length relative to the offset. A directed binary search is typically performed to locate a location 630 in the second table 610 designated by the range reference (e.g., the offset and length). At the location 630 within the second table 610 is a range of the listings having the "Attorneys" target element within the index 230. The range may be a continuous sequence of listings or the range may be a discontinuous sequence of pointers to specific listings within the index 230. Thus, the range defines the set of listings 640 related to the "Attorneys" target element.

The set of listings 635 related to the "Buckhead" target element is similarly determined. This is typically determined by using the type code for the "Buckhead" target element as the type code relates to the first table 605 to determine another range reference within the first table 605. The other range reference indicates another range within the second table 610. Thus, the intersection of the "Attorneys" set of listings 640 and the "Buckhead" set of listings 635 yields a set of listings 645 related to both the "Attorneys" target element and the "Buckhead" target element. Listing information about the listings within this intersection 645 is then read, preferably from within the memory map module 39 (e.g., the index 230), to provide the listing information related to the search query and related to data within the database 40.

It is important to realize that listing information may contain any amount or summary of the database's data related to each listing in the set. Furthermore, those skilled in the art will recognize that using two tables 605, 610 to define the relationship information provides a level of abstraction. In this manner, embodiments of the present invention may use different first tables with the same second table depending on the type of target element.

Given the above preface on the interrelationships between the index 230 and the relationship tables 235 within the memory map module 39 in a pointer/list embodiment of the present invention, the preferred steps for searching parts of a memory map module for listing information using the pointer/list method is described below with regard to FIG. 7.

Turning now to FIG. 7, the method 700 essentially describes step 535 of FIG. 5A in more detail for the pointer/list embodiment of the present invention. The method 700 begins at step 705 where a first table is searched using a target element of a search query to determine a range reference into a second table. For example, if the target element is "Buckhead", the first table 605 is preferably searched using the type code of the target element "Buckhead" (37) as a pointer to within the first table 605. The memory location 615 within the first table designated by the pointer is where the range reference is found.

At step 710, the second table is searched using the range reference to determine a range within an index, such as the exemplary index 230. The range is preferably a pointer or series of pointers to listings within the index 230.

At step 715, the index is then searched using the range from the second table. By searching the index with the range, a set of listings is provided that is related to the current target element.

At step 720, if the previously used target element is the last target element of the search query, all of the listing sets have been found related to the search query and step 720 proceeds directly to step 730. Otherwise, step 720 proceeds to step 725 where the next target element is identified to find the next set of listings. Step 725 proceeds back to step 705.

At step 730, the listing information on the listing sets is retrieved, preferably from within the memory map module. Alternatively, the listing information may be retrieved by performing a limited and narrow search of the database 40 using the search engine module 240. After step 730, the method 700 ends and returns to step 540 of FIG. 5A. In this manner, the memory map module is processed and searched using the pointer/list method according to an embodiment of the invention.

Reverse Mapping Embodiment

In another embodiment of the present invention, the memory map module 39 is searched and processed using a reverse mapping method. In the reverse mapping method, the relationship tables 235 are used as searchable string spaces that may be searched for a specific instance of a target element and then mapped back into the index 230. In this way, the listing sets can be quickly identified based upon the relationship information (e.g., the instances of the target element mapped back to specific listings in the index 230). Thus, the reverse mapping embodiment is especially useful when the target element is a specific name or phrase rather than a broad business category.

FIG. 8 is a diagram illustrating the contents of the relationship tables 235 according to the pointer/list method of searching the memory map module 39. FIG. 9 is a flow diagram illustrating the preferred steps for searching the memory map module 39 using the reverse mapping method.

Turning now to FIG. 8, the memory map module 29 and its components are illustrated in another embodiment of the present invention when compared to the embodiment illustrated in FIG. 6. More particularly, the index 230 and the relationship tables 235, comprising a name string space 805 and an address string space 810, are shown. For a given target element of the search query, the target element is preferably defined with a series of alphanumeric characters. The name string space 805 is preferably a large ASCII string of characters. A binary search is typically performed on the name string space 805 to find instances of the target element.

According to the present invention, an "instance" of a target element is not limited to an identical representation of the target element. Moreover, the present invention contemplates using an identical and a similar or truncated representation of the target element in order to find an "instance" of the target element. For example, using similar or truncated representations of the target element may account for instances of the target element having capitalization differences or only having the same leading or trailing word fragments.

Once an instance of the target element is found within the name string space 805, an offset reference is determined for the instance of the target element. The offset reference is merely a numeric identifier mapped back to a specific listing within the index 230. In the exemplary embodiment, the offset reference is a numeric identifier representing how far the instance is from the beginning of the name string space 805. For example, if the target element is "Cable Guy" and the ASCII characters "Cable Guy" appear beginning at 228th character into the name string space 805, then the offset reference for this instance is 228. Thus, the name string space 805 is searched for instances of the target element, which are then mapped back to listings 825, 830 within the index 230 using the offset reference of each instance of the target element.

Additionally, the target element may be known or related to other names. In such a situation, an alias may be inserted within the name string space 805 along with the instance of the target element. In this way, searches for the alias or proper name related to the instance of the target element may also be mapped back to the appropriate listing. For example, the alias "CGI" will then appropriately map back to listing associated with an instance of "Cable Guy".

In the reverse mapping embodiment of the present invention, the listing 825 corresponding to the instance of the target element typically comprises a unique identifier number (also known as a list account number), a display number, a name offset reference (the offset reference found in the name string space 805), and an address offset reference amongst other information.

As in the pointer/list embodiment, the display number is the number used when arranging listings within a set into a predetermined display order. The predetermined order may be random or a customized and predetermined order.

The address offset reference is a numeric identifier tied to a specific entry 835 of the address string space 810. The address string space 810 maintains the street address of each listing. The address offset reference of each listing maps the listing to the street address of the listing within the address string space 810. In another embodiment of the present invention, the street address of each listing may be maintained within a single file or table, such as the index 230, as opposed to being in a separate relationship table.

The listing may also contain geographical information (such as x and y coordinates related to a location on a map). The geographical information is useful if the search query includes a target element involving distance from a specific landmark. The geographical information may be used to determine if the listing falls within the targeted distance from the landmark, thus making the listing part of a particular listing set.

In summary, the listing information about each listing is preferably maintained within the memory map module 39. In this way, the listing information for each listing 825 may be obtained without searching the database 40.

If the search of the name string space 805 yields another instance of the target element, then a similar mapping process is performed to determine the listing related to the instance of the target element. As instances of the target element and their matching listings are found, the matching listings are added to a set of listings for the target element. If there are other target elements in the search query, then other sets of listings are created and an intersection of the listing sets provides the listing information related to the search query.

Referring back to the example where the search query was to find attorneys in the Buckhead community, a first target element is "Attorneys" and a second target element is "Buckhead". Regarding the "Attorneys" target element, the name string space 805 is searched until a first instance 815 of the "Attorneys" target element was found. This first instance 815 may correspond to an offset reference of 13. The offset reference of 13 is mapped back to a listing 825 in the index 230. Another instance 820 of the "Attorneys" target element is found within the name string space 805. This other instance 820 of the "Attorneys" target element corresponds to an offset reference of 125. The offset reference of 125 is also mapped back to a second listing 830 in the index 230. Thus, the two listings 825, 830 matching the respective offset references of the instances of the "Attorneys" target element are added to a set of listings related to the "Attorneys" target element.

The set of listings related to the "Buckhead" target element is similarly determined by searching the name string space 805. The intersection of the "Attorneys" set of listings and the "Buckhead" set of listings yields listings within the intersection related to both the "Attorneys" target element and the "Buckhead" target element. Listing information about the listings within this intersection is then read, preferably from within the memory map module 39, to provide the listing information related to the search query and related to data within the database 40. For example, the street address of each listing 825, 830 can be read from the address string space 810 to provide such listing information. However, if the listing information is not maintained entirely within the memory map module 39, a narrow focused search of the database 40 may reveal the appropriate listing information.

Given the above preface on the interrelationships between the index 230 and the relationship tables 235 within the memory map module 39 in a reverse mapping embodiment of the present invention, the preferred steps for searching parts of a memory map module for listing information using the pointer/list method are described below with regard to FIG. 9.

Turning now to FIG. 9, the method 900 essentially describes step 535 of FIG. 5A in detail for the reverse mapping embodiment of the present invention. The method 900 begins at step 905 where a string space, such as the name string space 805, is searched for each instance of a target element of a search query. At step 910, an offset reference is determined for each instance of the target element in the string space. The offset reference is preferably an identifier of the number of characters from the beginning of the first string space 805 to the location of the instance.

At step 915, the offset reference is mapped back to a matching listing within the index 230. Typically, a search of the name offset reference within each of the listings of the index 230 yields the matching listing when the name string space is searched. Listing information about the matching listing may be centrally located within a single table or file. Alternative, some listing information (such as the street address of the matching listing) may be maintained within another table or file (such as the address string space 810). At step 925, the matching listings for each instance of the target element are added to a set of listings.

At step 930, if the previously used target element is the last target element of the search query, all of the listing sets have been found related to the search query and step 930 proceeds directly to step 940. Otherwise, step 930 proceeds to step 935 where the next target element is identified to find the next set of listings. Step 935 proceeds back to step 905.

At step 940, the listing information on the listing set is retrieved, preferably from within the memory map module 39. Alternatively, the listing information may be retrieved by performing a limited and narrow search of the database 40 using the search engine module 240. After step 940, the method 900 ends and returns to step 540 of FIG. 5A. In this manner, the memory map module 39 is processed and searched using the reverse mapping method according to an embodiment of the invention.

Additionally, if the first string space is a string space of synonyms for the target element, it is contemplated that the offset reference can be multiple pointers mapping back to multiple listings within the index. For example, if the target element is "Attorneys", a search of the first string space may reveal several offset references operating as pointers to listings for "Barristers", "Lawyers" and other synonyms for the target element "Attorneys".

Conclusion

From the foregoing description, it will be appreciated that an embodiment of the present invention provides a system and method for processing a memory map (also called a memory map module 39) to provide listing information representing data within a database 40. Target elements of a search query are selected by referring to elements or listings within the memory map module 39. In this manner, each target element is pre-validated against data available within a database 40 (related to the memory map module 39). The memory map module 39 is a data structure in memory having an index to the data as well as relationship information between the data.

The memory map module 39 is searched to find listings (also referred to as sets of listings or listing sets) related to the target elements of the search query. In one embodiment, the memory map module 39 is searched by determining a range reference using a first table of the relationship information. A range is determined using the range reference to a second table of the relationship information. The range is used to search the index to find the listings. In another embodiment, a string space of the relationship information is searched for each instance of the target element. An offset for the instance is determined and is mapped back to a matching listing in the index 230. Each matching listing for each of the target elements is respectively added to the listings (also referred to as a listing set) for each of the target elements.

An intersection between the listings for each target element is determined. The listings within the intersection are arranged according to a display order. The display order can be a predetermined or randomized order. Finally, the listings within the intersection are displayed as listing information related to the search query.

The foregoing system may be conveniently implemented in one or more program modules having code that is based upon the flow diagrams in FIGS. 4, 5, 7, and 9. No particular programming language or code has been required to implement the steps described above because those skilled in the software programming field would be able to implement such steps in working code in light of the above description.

Moreover, the present invention has been described in relation to particular embodiments which are intended in all respects to be illustrative rather than restrictive. The particular embodiment described is one of processing or searching a memory map module 39 associated with a database 40 of classified advertising information in order to provide listing information about records within the database 40 without having to broadly search the database 40. However, those skilled in the art will understand that the principles of the present invention apply to any tasks or processes that must efficiently retrieve information from a structured collection of the information.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for processing a memory map to provide listing information representing data within a database, comprising the steps of:

receiving a request for listing information;

identifying a target element that corresponds to the request;

pre-validating the target element using the memory map to ensure that the target element represents the data present within the database, the memory map having an index to the data within the database and having relationship information between the data within the database;

creating a search query using the target element;

searching the index and the relationship information within the memory map for the listing information related to the search query; and delivering the listing information as results of searching the memory map.

2. The method of claim 1, wherein searching the index and the relationship information further comprises the steps of:
   searching the relationship information for a range within the index; and
   searching the index for the listing information using the range within the index.

3. The method of claim 1, wherein searching the index and the relationship information further comprises the steps of:
   determining a range reference using a first table of the relationship information and the target element of the search query;
   determining a range using a second table of the relationship information and the range reference; and
   searching the index for the listing information using the range.

4. The method of claim 1, wherein searching the index and the relationship information further comprises the steps of:
   searching the relationship information for each instance of the target element of the search query;
   mapping respectively the each instance of the target element found while searching the relationship information to a matching listing within the index; and
   determining the listing information based upon matching listings.

5. The method of claim 1, wherein searching the index and the relationship information further comprises the steps of:
   searching a string space for each instance of the target element of the search query;
   determining respectively an offset for the each instance of the target element found within the string space;
   mapping respectively the offset for the each instance of the target element to a matching listing within the index; and
   adding the matching listing found within the index to a listing set, the listing set providing the listing information.

6. The method of claim 1, wherein the listing information comprises a plurality of listings; and
   further comprising, determining a display order of the plurality of listings.

7. The method of claim 6, wherein the display order is a predetermined order.

8. The method of claim 6, wherein the display order is a randomized order.

9. The method of claim 6, further comprising the step of displaying the listing information according to the display order.

10. The method of claim 9, further comprising the step of searching the data within the database for additional information about one of the plurality of listings.

11. The method of claim 10, further comprising the step of displaying the additional information.

12. A computer-readable medium on which is stored a computer program for processing a memory map to provide listing information representing data within a database, the computer program comprising instructions, which when executed by a computer, perform the steps of:
   in response to receiving a request for listing information, identifying a target element that corresponds to the request;
   pre-validating the target element using the memory map to ensure that the target element represents the data present within the database, the memory map having an index to the data within the database and having relationship information between the data within the database;
   searching the index and the relationship information within the memory map for a plurality of listing sets respectively related to each of the target elements;
   determining an intersection of the listings among the listing sets;
   arranging the listings of the intersection according to a display order; and
   displaying the listings of the intersection in the display order as the listing information.

13. The computer-readable medium of claim 12, wherein searching the index and the relationship information further comprises:
   determining a range within the relationship information using one of the target elements of the search query;
   searching the index for one of the listing sets using the range, the one of the listing sets being identified within the range; and
   repeating the steps of determining a range within the relationship information and searching the index for one of the listing sets by using the remaining target elements of the search query to search the index for the remaining listing sets corresponding to the remaining target elements.

14. The computer-readable medium of claim 13, wherein the one of the listing sets and the remaining listing sets reference the listing information, and further comprising retrieving the listing information.

15. The computer-readable medium of claim 14, wherein the relationship information comprises a first table and a second table; and
   wherein determining a range within the relationship information further comprises searching the first table for a range reference to the second table using the one of the target elements and searching the second table using the range reference to determine the range.

16. The computer-readable medium of claim 12, wherein searching the index and the relationship information further comprises the steps of:
   searching a string space for each instance of one of the target elements, the string space being part of the relationship information;
   determining respectively an offset reference for the each instance of the one of the target elements found within the string space;
   mapping respectively the offset reference for the each instance of the one of the target elements to a matching listing in the index;
   adding the matching listing for the each instance of the one of the target elements to one of the listing sets; and
   repeating the foregoing steps by using the remaining target elements of the search query to search the index for the remaining listing sets corresponding to the remaining target elements.

17. The computer-readable medium of claim 12, wherein the display order is a predetermined order.

18. The computer-readable medium of claim 12, wherein the display order is a randomized order.

19. The computer-readable medium of claim 12 further comprising the step of searching the data within the database to provide additional information about one of the listings of the intersection.

20. A data structure for providing listing information representing data within a database, comprising:
- a first portion providing an index to the data within the database, the index having a plurality of listings, each of the listings having an associated category, wherein the index is used to pre-validate a request for listing information to ensure that the request represents the data present within the database; and
- a second portion providing relationship information between the data within the database and the listings within the index, the relationship information and the listings within the index together providing the listing information.

21. The data structure of claim 20, wherein the relationship information comprises a first table and a second table, which are used to provide an address range within the index.

22. The data structure of claim 21, wherein the relationship information further comprises a name string space populated with character strings, the character strings being related to the listings within the index.

23. The data structure of claim 22, wherein the relationship information further comprises an address string space related to the listings within the index, the address string space being related to the listings within the index.

* * * * *

UNITED STATES PATENT AND TRADEMARK OFFICE
CERTIFICATE OF CORRECTION

PATENT NO. : 6,295,526 B1
DATED : September 25, 2001
INVENTOR(S) : Barrett Morris Kreiner et al.

It is certified that error appears in the above-identified patent and that said Letters Patent is hereby corrected as shown below:

<u>Title page,</u>
Item [73], delete the following:
"[73]    Assignee:    BellSouth Intellectual Property Corporation
                     Atlanta, GA (US)"

And insert in its place:

"[73]    Assignee:    BellSouth Intellectual Property Corporation
                     Wilmington, DE (US) --

Signed and Sealed this

Twenty-second Day of October, 2002

Attest:

JAMES E. ROGAN
Attesting Officer          Director of the United States Patent and Trademark Office